United States Patent
Kadambar et al.

(10) Patent No.: US 12,068,839 B2
(45) Date of Patent: Aug. 20, 2024

(54) METHODS AND SYSTEMS FOR PERFORMING CELL SEARCH IN A MILLIMETER WAVE (MMWAVE) BASED COMMUNICATION NETWORK

(71) Applicant: Samsung Electronics Co., Ltd., Gyeonggi-do (KR)

(72) Inventors: Sripada Kadambar, Bangalore (IN); Ankur Goyal, Bangalore (IN); Ashok Kumar Reddy Chavva, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 17/572,997

(22) Filed: Jan. 11, 2022

(65) Prior Publication Data

US 2022/0173824 A1    Jun. 2, 2022

Related U.S. Application Data

(63) Continuation of application No. PCT/KR2020/009653, filed on Jul. 22, 2020.

(30) Foreign Application Priority Data

Jul. 22, 2019   (IN) .............................. 201941029559
Jul. 9, 2020   (IN) .............................. 201941029559

(51) Int. Cl.
*H04J 11/00* (2006.01)
*H04B 7/06* (2006.01)
*H04L 27/26* (2006.01)

(52) U.S. Cl.
CPC ........ *H04J 11/0069* (2013.01); *H04B 7/0695* (2013.01); *H04L 27/2614* (2013.01)

(58) Field of Classification Search
CPC .............. H04J 11/0069; H04J 11/0086; H04J 11/0073; H04J 11/0076; H04B 7/0695;
(Continued)

(56) References Cited

U.S. PATENT DOCUMENTS

| 10,277,349 B1 | 4/2019 | Kotecha et al. |
| 2009/0131047 A1* | 5/2009 | Amerga ................ H04W 48/16 455/434 |

(Continued)

FOREIGN PATENT DOCUMENTS

| WO | 2017/184190 A1 | 10/2017 |
| WO | 2019/088888 A1 | 5/2019 |

OTHER PUBLICATIONS

European Search Report dated Oct. 14, 2022.
(Continued)

*Primary Examiner* — Ian N Moore
*Assistant Examiner* — Sun Jong Kim
(74) *Attorney, Agent, or Firm* — Cha & Reiter, LLC

(57) ABSTRACT

Presented herein is a pre-$5^{th}$-Generation (5G) or 5G communication system that supports higher data rates beyond $4^{th}$-Generation (4G) communication systems. In particular, methods and systems for performing cell search in a millimeter wave (mmWave) based communication network are presented. A method disclosed herein includes selecting a subset of receive (Rx) beams from a plurality of Rx beams and scheduling a scan order for the selected subset of Rx beams, upon receiving a plurality of signals from a Base Station. The method also includes performing a cell search using the selected subset of Rx beams individually in the determined scan order. The method further includes combining two or more of the selected Rx beams, upon failing the cell search using the selected subset of Rx beams (Continued)

individually. The method further includes performing the cell search using the combined Rx beams.

18 Claims, 19 Drawing Sheets

(58) Field of Classification Search
CPC ............... H04B 7/088; H04B 7/06952; H04B 7/06954; H04B 7/06956; H04B 7/06958; H04B 7/0696; H04B 7/06962; H04B 7/06964; H04B 7/06966; H04B 7/06968; H04L 27/2614; H04L 27/261
See application file for complete search history.

(56) References Cited

U.S. PATENT DOCUMENTS

| | | | |
|---|---|---|---|
| 2010/0184433 A1* | 7/2010 | Plestid | H04W 48/18 455/435.2 |
| 2015/0173004 A1 | 6/2015 | Nigam et al. | |
| 2015/0373687 A1 | 12/2015 | Callard et al. | |
| 2017/0086196 A1 | 3/2017 | Arumugam et al. | |
| 2017/0164211 A1 | 6/2017 | Ho et al. | |
| 2018/0332659 A1 | 11/2018 | Hwang et al. | |
| 2019/0068270 A1 | 2/2019 | Schenk et al. | |
| 2020/0084678 A1* | 3/2020 | Gunnarsson | H04W 36/00837 |
| 2020/0128467 A1* | 4/2020 | Gao | H04W 36/305 |
| 2020/0245270 A1* | 7/2020 | Harada | H04W 56/001 |

OTHER PUBLICATIONS

Sripada Kadambar et al., "Millimeter Wave Multi-Beam Combining Algorithm for Efficient 5G Cell Search"; 6 pages; 2020 IEEE 17th Annual Cosumer Communications & Networking Conference(CCNC).
Indian Office Action; Dated: Oct. 11, 2021.
European Search Report Dated Jul. 12, 2022.
European Office Action dated Jun. 25, 2024.

* cited by examiner

Lower latency
Worse performance

Higher latency
Better performance

METHODS AND SYSTEMS FOR PERFORMING CELL SEARCH IN A MILLIMETER WAVE (MMWAVE) BASED COMMUNICATION NETWORK

CROSS-REFERENCE TO RELATED APPLICATION(S)

This application is a continuation of International Application No. PCT/KR2020/009653, filed on Jul. 22, 2020, which claims priority to Indian Provisional Patent Application No. 201941029559 and Indian Non-Provisional Patent Application No. 201941029559, filed on Jul. 22, 2019 and Jul. 9, 2020, respectively, the disclosure of which are herein incorporated by reference in its entirety.

BACKGROUND

1. Field

One or more embodiments of the present disclosure generally relate to the field of wireless communication networks and more particularly to performing a cell search in a beam formed millimeter wave (mmWave) based communication network.

2. Description of Related Art

The demand for wireless data traffic has increased since the deployment of 4G communication systems, and efforts have been made to develop an improved 5G or pre-5G communication system. Therefore, the 5G or pre-5G communication system is also called a "Beyond 4G Network" or a "Post LTE System."

The 5G communication system is implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), Full Dimensional MIMO (FD-MIMO), array antenna, analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK, QAM Modulation (FQAM), and sliding window superposition coding (SWSC) may be deployed as advanced coding modulation (ACM), and filter bank multi carrier (FBMC), non-orthogonal multiple access (NOMA), and sparse code multiple access (SCMA) may be deployed as advanced access technology.

The fifth generation (5G) New Radio (NR) network supports signal transmissions in millimeter wave (mmWave) frequencies in order to provide significantly high throughput and low latency. As the mmWave frequencies suffer from higher path-loss, the signal transmission in the mmWave frequencies is subjected to higher attenuation, the NR network employs directional transmissions and receptions with beamforming methods. In the NR network, a Base Station (BS) (next generation node B (gNB), a transmitter) and a User Equipment (UE) include uniform rectangular arrays (URA) to support the directional transmissions and receptions with the beamforming methods. The URA includes one or more antenna elements arranged in a grid. The BS uses the one or more antenna elements of the URA to form beams (the beams formed by the BS are hereinafter referred as transmission (Tx) beams). The BS then transmits the signals to the UE in the Tx beams in specific directions. The UE uses the one or more antenna elements of the URA to form beams (the beams formed by the UE are hereinafter referred as receive (Rx) beams). The UE receives the signals sent on the TX beams on the formed Rx beams in the specific directions.

Further, scheduling information may also be transmitted in the mmWave frequencies. The scheduling information provides directional data/information along with time and frequency indication to the UE for receiving the signal corresponding to the Tx beams in the specific directions. However, while performing a cell search, the scheduling information/directional information may be unavailable for the UE. The cell search may be performed to detect the BS in the vicinity of the UE, either to establish a new connection during an initial access, or to find a neighboring cell for handover or cell reselection. As the directional information is unavailable during the cell search, the UE has to scan the Rx beams exhaustively in all receive directions until the UE finds the BS/cell. Thus, compared to legacy 4G networks (which uses Omni-directional transmissions), cell search in mmWave frequencies suffers from higher latency and complexity.

FIG. 1A depicts a cell search performed by a UE in an example of a conventional NR network/mmWave based communication network. As depicted in FIG. 1A, in the mmWave based communication network, a BS/gNB forms a plurality of Tx beams to transmit signals to the UE in specific directions. In the example herein, the gNB uses three Tx beams (Tx beam 1, Tx beam 2, and Tx beam 3) to transmit the signal to the UE in the specific directions (for example, 90°, 180°, and 270°). The gNB transmits the Tx beam 1, Tx beam 2, and Tx beam 3 to the UE through a mmWave channel that can be characterized with a plurality of dominant clusters or receive directions. In one example, the clusters can be, but not limited to, reflectors, buildings, reflective surfaces, and so on. In the example herein, the Tx beam 1 may be reflected by one cluster while transmitting to the UE, the Tx beam 2 may be blocked by a blocker present in between the BS and the UE, and the Tx beam 3 may reflected by two clusters while transmitting to the UE.

SUMMARY

The UE forms a plurality of Rx beams to receive the signals sent on the Tx beams from the BS in different directions. In the example shown in FIG. 1A, the UE forms a Rx beam 1, a Rx beam 2, and a Rx beam 3 to receive the signals corresponding to the Tx beams (Tx beam1-Tx beam 3) on the one or more Rx beams (for example; the Rx beam 1, the Rx beam 2, and the Rx beam 3). In the example herein, the UE may receive the signal corresponding to the Tx beam 1 (that is deflected by one cluster) on the Rx beam 1. The UE may receive the signal corresponding to the Tx beam 3 on the Rx beam 2 and the Rx beam 3. The UE may not receive the signal corresponding to the Tx beam 2, due to the presence of a blocker in the transmission path of the Tx beam 2. The UE performs the cell search to detect the gNB present in its vicinity, by scanning the signals received on the Rx beams. However, the UE has to perform the cell search exhaustively in all the directions of the Rx beams until the UE detects the gNB/cell, as the UE does not have directional information/scheduling information of the Rx beams. Thus, the cell search in the conventional mmWave based communication system suffers from high latency and complexity.

Further, in the conventional mmWave based communication systems, to improve latency, the UE may use wider Rx beams for performing the cell search. Consider an example scenario as depicted in FIG. 1B, where the UE uses 4 wider Rx beams to perform the cell search, where each Rx beam can be active for duration of 20 milliseconds (ms). The cell search performed using the wider Rx beams may decrease the latency of the cell search, as the total time required to scan the 4 wider Rx beams is relatively low (for example 80 ms). However, performance of the UE may be degraded, as the wider beams may not be powerful enough to detect cells farther away.

Alternatively, in the conventional mmWave based communication systems, to improve performance, the UE may use narrow Rx beams for performing the cell search. Consider another example scenario as depicted in FIG. 1C, where the UE uses at least 20 narrow Rx beams to perform the cell search. The cell search performed using the narrow Rx beams may enhance the performance of the UE. However, the latency of the cell search may be increased, as the total number of narrow Rx beams required to cover all the directions is higher and the total time required to scan such a number of narrow Rx beams is relatively high (for example 400 ms is required to scan the 20 narrow Rx beams).

Thus, cell search performed in the conventional mmWave based communication systems suffers from performance versus latency tradeoff.

According to an embodiment, a method for performing a cell search in a millimeter wave (mmWave) based communication network comprises monitoring, by a User Equipment (UE), a plurality of signals from at least one Base Station (BS) on a plurality of receive (Rx) beams, determining, by the UE, power metrics associated with each of the plurality of Rx beams, selecting, by the UE, a subset of Rx beams from the plurality of Rx beams using the determined power metrics associated with each of the plurality of Rx beams, and performing, by the UE, the cell search by scanning the selected subset of Rx beams in a pre-determined order to detect a cell identifier (ID) of the at least one BS.

Additional aspects will be set forth in part in the description which follows and, in part, will be apparent from the description, or may be learned by practice of the presented embodiments.

BRIEF DESCRIPTION OF DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1A:
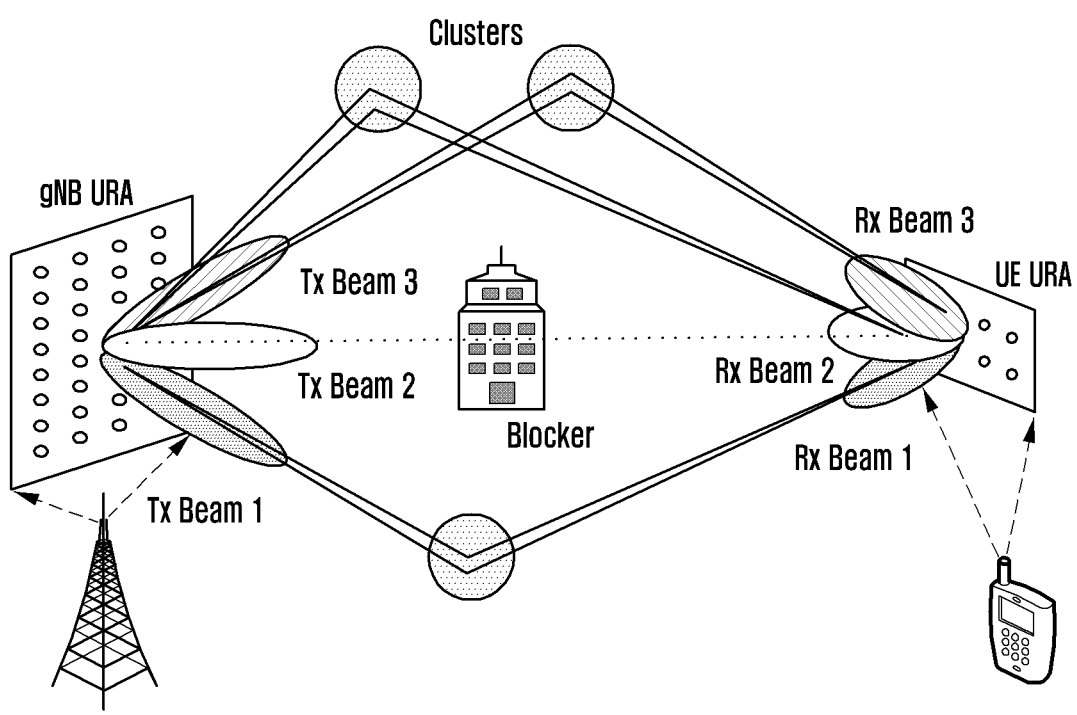
FIG. 1A depicts a cell search performed by a User Equipment (UE) in an example of a conventional millimeter wave (mmWave) based communication network.
Figure 1B:
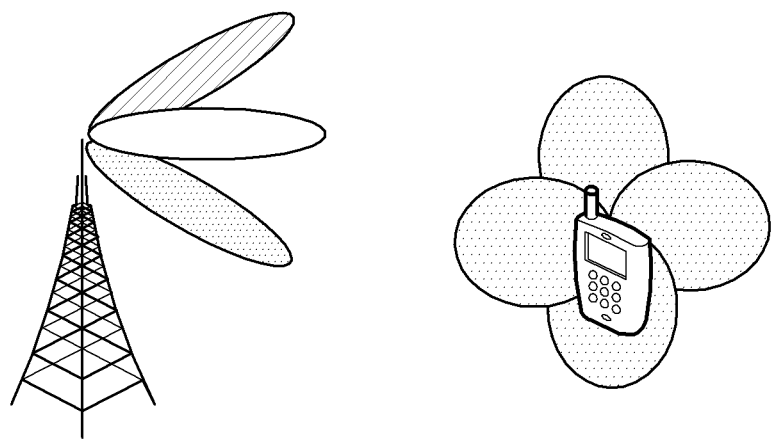
FIG. 1B depicts the cell search performed using wider receive (Rx) beams in an example of a conventional millimeter wave (mmWave) based communication network.
Figure 1C:
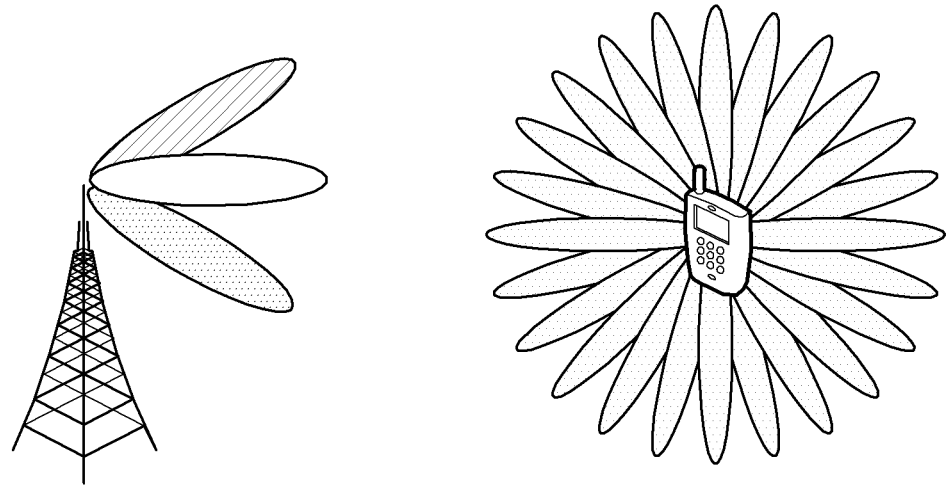
FIG. 1C depicts the cell search performed using narrow Rx beams in an example of a conventional millimeter wave (mmWave) based communication network.

To remedy the problems described above, one or more embodiments herein provide methods and systems for performing cell search in a millimeter wave (mmWave) based communication system. A method disclosed herein includes receiving a plurality of signals from at least one Base Station (BS) on a plurality of receive (Rx) beams formed in at least one specific orientation. The method further includes selecting a subset of Rx beams from the plurality of Rx beams using power metric associated with each Rx beam. The method further includes performing the cell search using the selected subset of Rx beams to detect a cell identifier (ID) of the at least one BS.

Also, one or more embodiments herein provide a User Equipment (UE) in a millimeter wave (mmWave) based communication network, where the UE includes a memory and a controller. The controller is configured to receive a plurality of signals from at least one Base Station (BS) on a plurality of receive (Rx) beams formed in at least one specific orientation. The controller is further configured to select a subset of Rx beams from the plurality of Rx beams using power metric associated with each Rx beam. The controller is further configured to perform the cell search using the selected subset of Rx beams to detect a cell identifier (ID) of the at least one BS.

These and other aspects of the illustrative embodiments disclosed herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

One object of one or more embodiments herein is to perform cell search in a millimeter wave (mmWave) based communication network.

Another object of one or more embodiments herein is to enable a User Equipment (UE) to perform cell search using beam scheduling, upon receiving a set of signals from at least one Base Station (BS) on a set of receive (Rx) beams in at least one specific orientation, where the beam scheduling includes selecting a subset of Rx beams from the set of Rx beams and determining a scan order for the selected subset of Rx beams.

Another object of one or more embodiments herein is to enable the UE to perform the cell search by jointly processing the selected Rx beams upon failing of the cell search using the individual beam scheduling.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein disclose methods and systems for performing cell search in a millimeter wave (mmWave) based communication system with low latency and high performance.

Referring now to the drawings, and more particularly to FIGS. 2A through 13B, where similar reference characters denote corresponding features consistently throughout the figures, there are shown example embodiments.

Figure 2A:
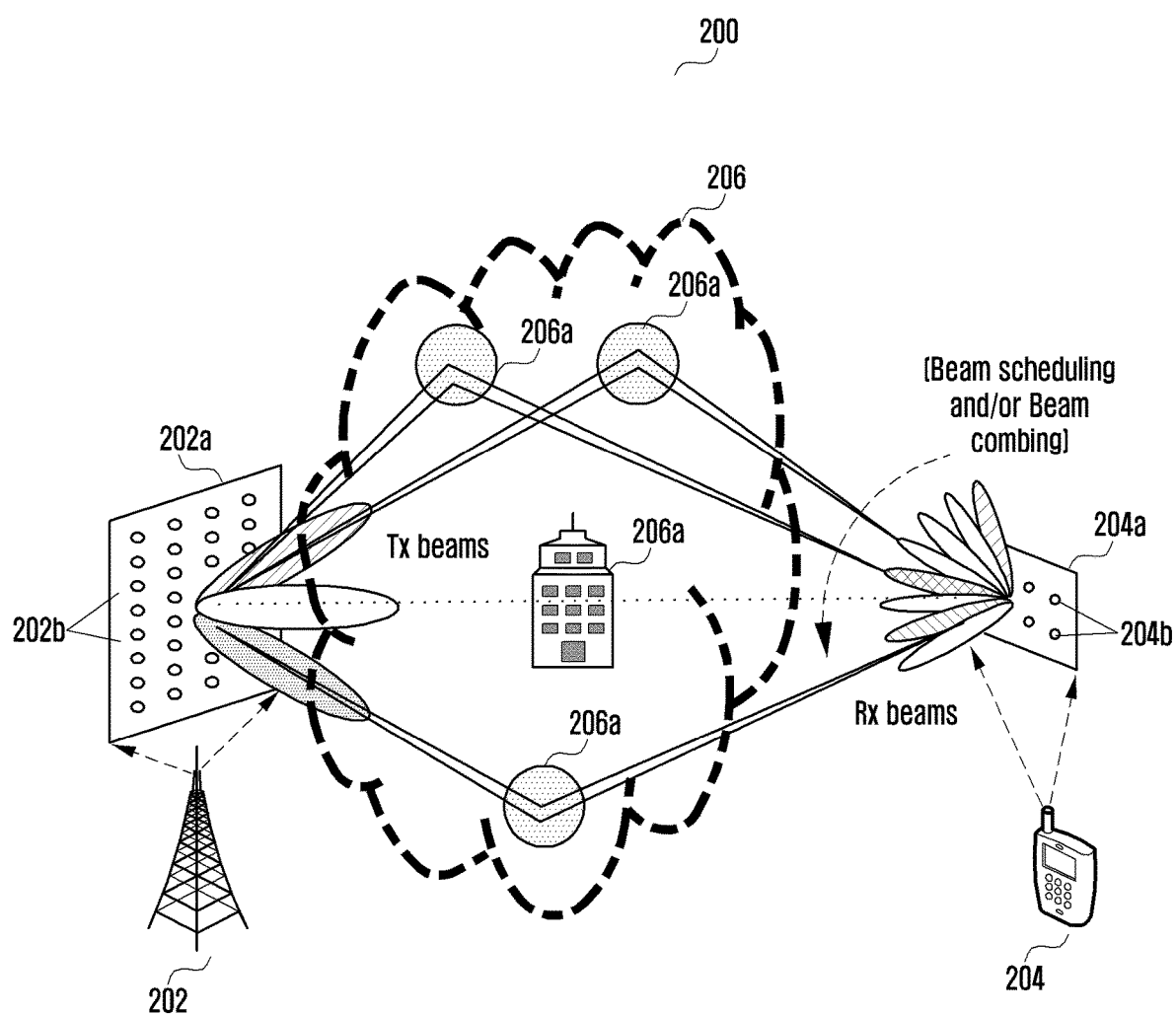
FIG. 2A depicts a mmWave based communication network, according to an embodiment as disclosed herein.

FIG. 2A depicts a communication network 200, according to an embodiment as disclosed herein. The communication system/network 200 as referred to herein can support communication in millimeter wave (mmWave) frequency bands to provide high throughput and low latency. The mmWave frequency bands can be Extremely High Frequency (EHF) bands as defined by International Telecommunications Union (ITU). In an example, the mmWave can be in a range of 1 mm-100 mm, which corresponds to radio frequency of 3 Giga Hertz (GHz)-600 GHz. In an example, the communication involves at least one of, but not limited to, broadcast signals, data plane messages, control signaling, control plane messages, and so on. Examples of the communication system 200 can be, but is not limited to, a Fifth Generation (5G) New Radio (NR) network, a 5G/NR communication system, or any other next generation network, which supports the communication in the mmWave frequency bands. Embodiments herein use the terms such as "communication system," "mmWave based communication system," "5G/NR communication network," and so on interchangeably through the document to refer to the communication system/network 200.

The communication network 200 includes at least one BS 202, and at least one User Equipment (UE) 204.

The BS/Radio Access Network (RAN) 202 referred to herein can be nodes such as, but not limited to, next generation nodes (gNBs), or the like. The BS 202 can be configured to connect the at least one UE 204 with a Core Network (CN) (not shown). The CN creates bearers for routing data/traffic between a particular gateway in the CN and the UE 204. Examples of the data referred to herein can be, but not limited to, voice packets, video packets, data packets, and so on.

The UE 204 referred to herein can be a user device that is capable of using the mmWave based communication network 200. Examples of the UE 204 can be, but is not limited to, a mobile phone, a smartphone, a tablet, a phablet, a personal digital assistant (PDA), a laptop, a computer, a wearable computing device, a vehicle infotainment device, an Internet of Things (IoT) device, a Virtual Reality (VR) device, a Wireless Fidelity (Wi-Fi) router, a USB dongle, or any other processing devices capable of using the mmWave based communication network 200. The UE 204 can support at least one Subscriber Identity Module (SIM) to communicate with the at least one BS 202.

In the mmWave based communication network 200, the BS 202, and UE 204 support directional communication by performing beamforming. The BS 202 can be configured to use uniform rectangular arrays (URA) 202a to perform the beamforming. The URA 202a may include one or more antenna elements/ports 202b arranged in a grid. The URA 202a may also include antenna arrays 202b including a plurality of antenna elements 202b. The BS 202 uses the one or more antenna elements 202b of the URA 202a to form beams having different widths. Examples of the beams can be, but is not limited to, wider beams, narrow beams, and so on. The beams can be in various shapes or patterns. The shapes or patterns of the beams can be regular, meaning the beams may have similar shapes and patterns. The shapes or patterns of the beams can also be irregular. In an example herein, the shapes or patterns of the beams can be, for example, pencil beam shape, cone beam shape, irregular main lobe with side lobes, and so on. In an embodiment, the beams transmitted by the BS 202 are referred to hereinafter as transmission (Tx) beams.

The BS 202 can transmit at least one of, but not limited to, downlink control channel information, broadcast signals and messages, broadcast data channels, multicast and unicast data, control signals and messages, and so on (hereinafter collectively referred to as signals) to the UE 204 in the Tx beams. The BS 202 can transmit the signals on Tx beams over at least one transmit path of the mmWave channel 206 in different directions. In an embodiment, the mmWave channel 206 can be characterized with at least one cluster 206a or at least one receive direction 206a. Examples of the cluster 206a can be, but not limited to, buildings, reflective surfaces, reflectors, blockers, and so on. In an embodiment, the mmWave channel 206 may not include any clusters 206a. In one example, the BS 202 can transmit the signals in three Tx beams to the UE 204 over first, second and third transmit paths of the mmWave channel 206a in specific directions.

The UE 204 can be configured to use an URA 204a to perform the beamforming. The URA 204a may include one or more antenna elements/ports 204b arranged in a grid. The URA 204a may also include antenna arrays 204b including a plurality of antenna elements 204b. The UE 204 can use the antenna elements 204b of the URA 204a to form beams with different widths (for example, wider beams, narrow beams, and so on) at specific orientations/directions. In an embodiment, the beams formed at the UE 204 are referred to hereinafter as receive (Rx) beams. The UE 204 can receive the signals transmitted in the Tx beams by the BS 202 on the formed one or more Rx beams in the specific orientation (an angle of arrival) over receive paths of the mmWave channel 206. The received signals corresponding to the Tx beams may be reflected by the one or more clusters 206a present in the mmWave channel 206. In an example, the UE 204 may receive the signals corresponding to the three Tx beams on eight Rx beams in a first orientation.

Figure 2B:
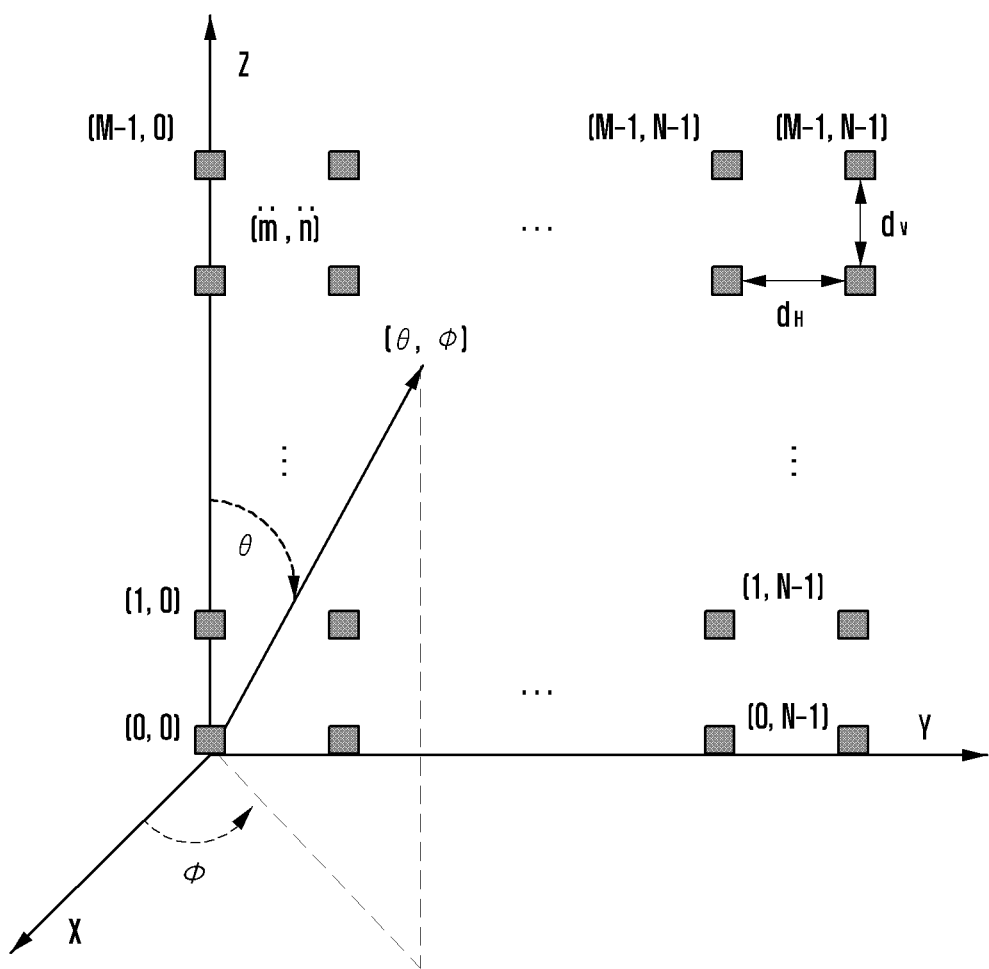
FIG. 2B depicts a uniform rectangular array (URA) of at least one of a Base Station (BS), and a User Equipment (UE) according to an embodiment as disclosed herein.

In an embodiment, as depicted in FIG. 2B, for supporting the directional communication with the beamforming, the BS 202, and the UE 204 can be equipped with the URA (202a, 204a) of size (M, N, P), where M and N represent a number of rows and columns of the antenna elements (m, n) respectively and P represents antenna polarizations. The antenna elements (m, n) can thus be arranged in a rectangular grid with dH spacing in the horizontal direction, and dV spacing in the vertical direction. The BS 202 and the UE 204 can steer the beam/radiation pattern from the URA (202a, 204a) along an azimuth angle/direction Ø and an elevation angle θ by controlling an excitation $\beta_{mn}$ on the antenna elements. In an embodiment, the BS 202 can control precoder phase excitation on the antenna elements to steer the beam from the URA 202a in the direction ($\theta_0$, $\emptyset_0$) as depicted in FIG. 2B.

In an embodiment, the UE 204 can control phase excitation on the antenna elements to steer the beam from the URA 204a in the direction ($\theta_0$, $\emptyset_0$), as depicted in FIG. 2B. Controlling phase excitation involves changing phase coefficient of the antenna elements to steer the beam in the specific directions. In an example herein, the excitation $\beta_{mn}$ on the antenna elements can be controlled using the below equation:

$$\beta_{mn} = \frac{(e^{(j2\pi(n-1)\frac{dv}{\lambda}\sin(\theta_0) - (m-1)\frac{dH}{\lambda}\cos(\theta_0)\sin(\emptyset_0)))}}{\sqrt{(MN)}}$$

Further, when the UE 204 initiates cell search in the initial access state, the UE 204 operates with a time and frequency offset with respect to the BS 202, while receiving the signals from the BS 202. The time and frequency offsets can be caused by an inaccuracy of a clock associated with the UE 204. Thus, the time and frequency offsets have to be corrected, while performing the cell search.

In an example herein, the antenna element in the URA 204a of the UE 204 can be represented as u={(m,n)∈U} and the corresponding phase excitation can be represented as $w_{ue}^{k,u}$, where k represents a beam index of the UE 204. In an example herein, the antenna element in the URA 202a of the BS 202 can be represented as S={(m,n)∈S} and the corresponding phase excitation can be represented as $w_{bs}^{l,s}$ for $l^{th}$ Tx beam. Further, the signals received and transmitted by the antenna elements of the UE 204 and the BS 202 (u, s) using the Rx and Tx beams (k, l) can be represented as $y_p^{k,l}$ and $x^l$ respectively, where the reception of the signal over different polarizations is denoted by p∈P In an example herein, the signal received by the UE 204 from the BS 202 on the $k^{th}$ Rx beam can be represented using the below equation:

$$y_p^{k,l}(n) = \sum_{u \in A_{ue}} ((w_{ue}^{k,u})^* * (\sum_{s \in A_{bs}} h^{us}(n) \circledast w_{bs}^{l,s} x^l(n))) + \eta^u(n))e^{\frac{-2\pi i n \hat{\in}}{N_{fft}}}$$

where $h^{us}$ represents a fading channel between the antenna elements of the UE 204 and the BS 202, $\eta^u$ represents an additive white Gaussian noise for reception of the signal from the antenna element u of the UE 204, $N_{fft}$ represents Fast Fourier Transform (FFT) used by the UE 204 for the reception of the signal on the $k^{th}$ Rx beam, and $\hat{\in}$ represents a frequency offset of the UE 204 with respect to the BS 202 that is normalized with subcarrier spacing.

Figure 2C:
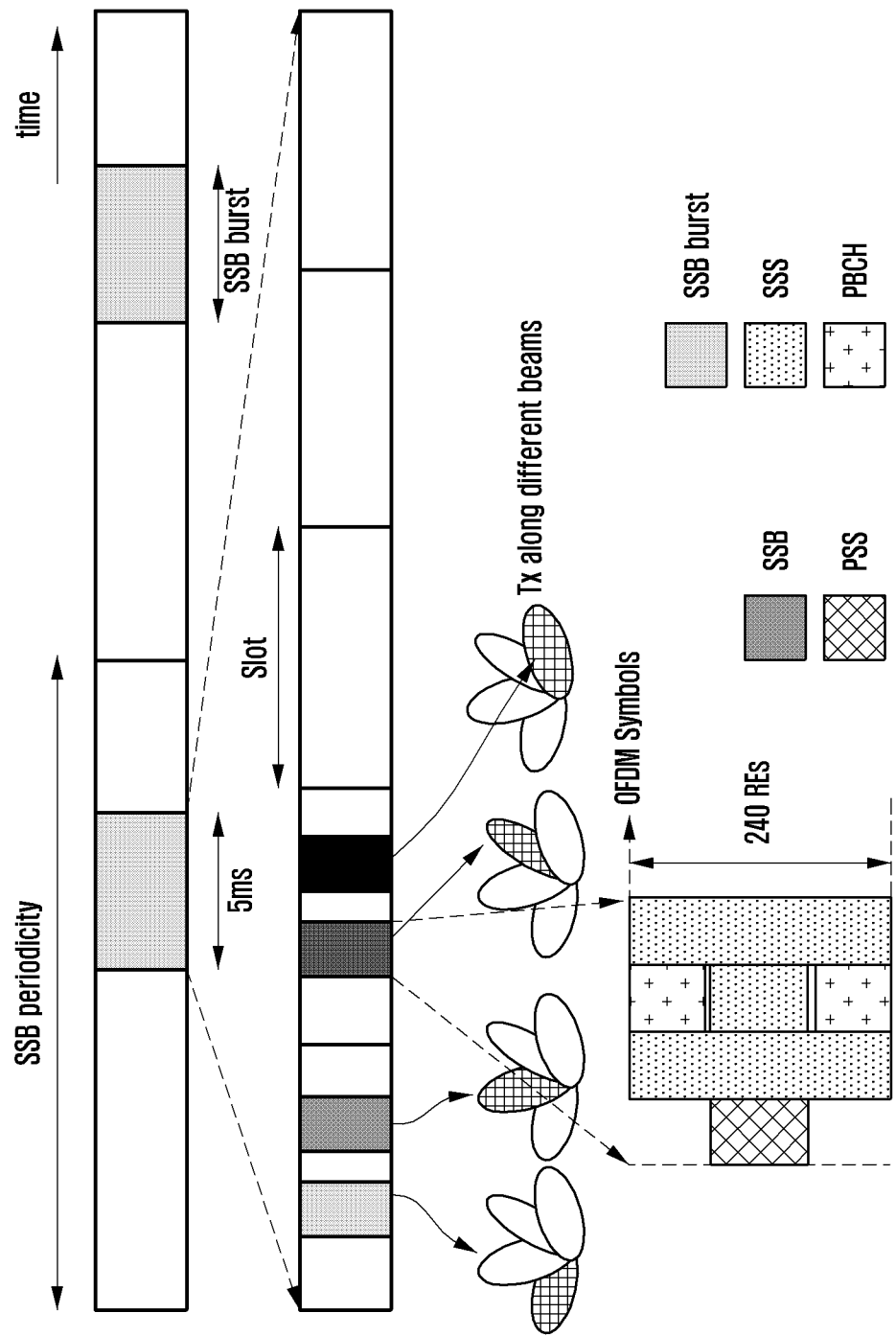
FIG. 2C depicts a synchronization and physical broadcast channel (PBCH) block (SSB block) transmitted by the at least one BS to the UE, according to an embodiment as disclosed herein.

The BS 202 can be configured to transmit synchronization signals (SS) with physical broadcast channel (PBCH) data to the UE 204 in the at least one Tx beam. The UE 204 may use the SS to detect the BS/cell 202. The SS includes a primary synchronization signal (PSS) and a secondary synchronization signal (SSS). As depicted in FIG. 2C, the BS 202 may include the SS within a synchronization signal and PBCH block (SSB) and transmit the SSB to the UE 204 in all the Tx beams. Further, an SSB burst (that includes a set of SSBs) has a duration of 5 ms. In an example herein, the SS included in the SSB may further comprise of 240 subcarriers with the PSS and the SSS centered at the first and third symbols of the SSB respectively. The SSB in the at least one Tx beam can be identified with an SSB index, which has a fixed Orthogonal frequency-division multiplexing (OFDM) symbol mapping with in the SSB burst. In an example herein, duration of the SSB is 4 OFDM symbols. The BS 202 may transmit up to 'L' SSBs, where L can be defined based on the operating frequency. The 'L' can be determined in accordance with the 3GPP specification 38.213 section 4.1. The 'L' can depend on carrier frequency and sub carrier spacing. In an embodiment, the BS 202 may transmit the SSB in the at least one Tx beam to the UE 204 from the same antenna element/port 202b in different SSB transmission periods, and subcarrier spacing. The subcarrier spacing may be dependent on a band of operation. In an example, the BS 202 may transmit the SSB in the subcarrier spacing of 15 Kilohertz (kHz), 30 kHz, 120 kHz, and 240 kHz. In an embodiment, the BS 202 may transmit each SSB within the at least one Tx beam on the different antenna ports 202b.

The UE 204 can be configured to perform a cell search on receiving the signals sent on the at least one Tx beam on a plurality/set of Rx beams formed in at least one specific orientation. In an embodiment, the UE 204 may perform the cell search in an initial access state to detect the at least one BS 202 in its vicinity for establishing a new connection. In the initial access state, the UE 204 may not be connected/camped on to any BS/cell 202. In another embodiment, the UE 204 may perform the cell search in a connected state to detect at least one neighbor BS 202 for a handover or cell reselection. In the connected state, the UE 204 may be connected with the at least one BS/cell 202. In this embodiment, the BS 202, with which the UE 204 is connected in the connected state, is referred to hereinafter as a serving BS/cell 202, a primary BS/cell 202, and so on, through the instant document. The cell search involves detecting a cell identifier (cell ID) of the at least one BS 202 by identifying the SS (the PSS and the SSS) from the signals received on the plurality of Rx beams.

In an embodiment, the UE 204 performs the cell search using beam scheduling. The beam scheduling involves selecting a subset of Rx beams from the plurality of Rx beams, thus determining the selected subset of the Rx beams for the cell search. In an embodiment, the UE 204 may consider all the Rx beams of the different widths jointly for the beam scheduling. In an embodiment, the UE 204 may consider a set of Rx beams of the same width ranging from a widest beam width set to a narrowest beam width set for the beam scheduling. The widest beam width set includes the wider Rx beams, and the narrowest beam width set includes the narrow Rx beams.

On receiving the signals corresponding to the at least one Tx beam on the plurality/set of Rx beams, the UE 204 measures power metric associated with each Rx beam. In an embodiment, measuring the power metric associated with each Rx beam refers to measuring the power metric of the signal received on each Rx beam. The UE 204 measures the power metric associated with each Rx beam using at least one parameter of each Rx beam. Examples of the parameter can be, but not limited to, time domain average power estimate, frequency domain power estimate, automatic gain controller (AGC) gain, and so on. For the cell search, the UE 204 may select one or more Rx beams that have relatively higher power metrics compared to other Rx beams. The Rx beams with the higher power metrics can be the Rx beams that have received signals that are reflected by the one or more clusters with higher power metrics. The selection of the Rx beams with the higher power metrics for the cell search may increase probability of detecting the cell ID of the BS/cell 202. In an embodiment, the number of Rx beams selected for the cell search may vary dynamically. For example, the UE 204 may select 3 Rx beams from a total of 8 Rx beams. The UE 204 may select the number of Rx beams based on at least one factor. Examples of the factor can be, but is not limited to, complexity-latency gain tradeoff, memory requirements, and so on.

When selecting the Rx beams, the UE 204 determines an order for the selected Rx beams for performing the cell search. The determined order can be an order of the selected Rx beams, according to which the UE 204 scans the Rx beams for performing the cell search. Thus, determining the order of the selected Rx beams includes prioritizing the selected Rx beams or arranging the selected Rx beams in a sequence for the cell search. Embodiments herein use the terms "scan order," "prioritized order," "scan list," and so on, interchangeably to refer to the determined order of the selected Rx beams. In an embodiment, the UE 204 determines the scan order of the selected Rx beams based on the power metric associated with each of the selected Rx beams. In an example herein, the UE 204 may determine the order of the selected Rx beams as a decreasing order of their associated power metric (i.e., from best to worst power metric).

The UE 204 performs the cell search on the selected Rx beams individually according to the determined scan order. For performing the cell search, the UE 204 scans the selected Rx beam that is first in the scan order (i.e. present in the first position in the scan order) for the cell search and collects the signal/samples received on the scanned Rx beam. The UE 204 then determines the SS (the PSS and the SSS) in the signal received on the scanned Rx beam. The UE 204 uses the determined SS to detect the cell ID of the BS/cell 202. Thereby, detecting the BS/cell 202 in the vicinity of the UE. In an embodiment, the UE 204 determines the PSS and the SSS, and the cell ID in accordance with the 3GPP specification. If the UE 204 does not detect the cell ID of the BS/cell 202 using the signal received on the Rx beam that is first in the scan order for the cell search, the UE 204 recursively scans the subsequent Rx beam according to the determined scan order, collects the signal received on the scanned Rx beam, and uses the collected signal to detect the cell ID of the BS/cell 202 until a valid cell ID is detected using the at least one Rx beam or all the selected Rx beams are scanned according to their determined scan order. Thus, performing the cell search using the beam scheduling decreases cell search latency by mitigating the conventional requirement of scanning all the plurality of beams.

In an embodiment, the UE 204 may perform beam combining to perform the cell search, if the UE 204 does not detect a valid cell ID of the BS 202 using the selected Rx beams individually in their determined scan order. The beam combining involves combining of the two or more selected Rx beams to form the combined beam set. In an embodiment, combining of the two or more selected Rx beams refers to combining of the two or more signals received on the selected two or more Rx beams. The combined beam set may include a plurality of combinations of the selected Rx beams. In an embodiment, a number of selected Rx beams combined to form the combined beam set may dynamically vary based on the at least one factor. Examples of the factor can be, but not limited to, complexity-performance gain trade off, hardware requirements, memory requirements, and so on. For example, the combined beam set may include a combination of selected 3 Rx beams (the Rx beam 1, the Rx beam 2, and the Rx beam 4), and a combination of 5 selected Rx beams (the Rx beam 1, the Rx beam 2, the Rx beam 3, the Rx beam 4, and the Rx beam 5), when the 5 Rx beams are selected for the cell search using beam scheduling. Embodiments herein use the terms "combined beam," "combined signal," "combined beam set," and so on interchangeably to refer to combining the signals received on the selected Rx beams.

In an embodiment, the UE 204 may use coherent combining and non-coherent combining to combine the selected Rx beams. In coherent combining, the UE 204 combines both the power and phase of the two or more signals received on the two or more selected Rx beams. In non-coherent combining, the UE 204 combines only the power of the two or more signals received on the two or more selected Rx beams, where the phase of the signals received on the selected beams may be identical and independent. When combining the signals received on the selected Rx beams, the UE 204 scans the combined beam set to determine the PSS and the SSS. The UE 204 then detects the cell ID of the BS 202 using the determined PSS and SSS. If the UE 204 does not detect a valid cell ID using the at least one signal of the combined beam set, the UE 204 ends the cell search process with respect to the received orientation of the signal. Thus, performing the cell search using the beam combining method increases performance of the UE 204 in detecting the cell ID of the BS 202.

Consider an example scenario, where the UE 204 performs cell search while receiving signals corresponding to 3 Tx beams from the BS 202 on 8 Rx beams (Rx beam 1-Rx beam 8). The received signals may vary in power, as the received signals may be reflected by the one or more clusters 206a present in the mmWave channel 206. In such a scenario, the UE 204 selects the subset of Rx beams from the 8 Rx beams based on the power metric associated with each of the 8 Rx beams. In an example herein, consider that the UE 204 selects the Rx beam 1, the Rx beam 2, and the Rx beam 3 from the 8 Rx beams, when the Rx beams 1, 2, and 3 each has a higher power metric compared to the other Rx beams. The selected Rx beams 1, 2, and 3 with the higher power metric implies that the signals being receiving on the Rx beams 1, 2, and 3 have been reflected from the one or more clusters 206a with a higher power metric. Thus, the selected Rx beams 1, 2, and 3, which have received the signals from the clusters with the higher power may be good for reception. On selecting the Rx beams 1, 2, and 3, the UE 204 determines the scan order of the selected Rx beams 1, 2, and 3 for the cell search. In an embodiment, the UE 204 arranges the selected Rx beams 1, 2, and 3 in a decreasing order of their associated power metric. For example, the UE 204 may determine the Rx beam 1 for the cell search first and followed by the Rx beam 3, and the Rx beam 2.

The UE 204 scans the Rx beam 1 first (as per the determined scan order) to collect the signal/samples received on the Rx beam 1 and uses the collected signal/samples to determine the PSS and the SSS. The UE 204 uses the determined PSS and the SSS to detect the cell ID of the BS 202. If the UE 204 does not determine the PSS and SSS in the signal received on the Rx beam 1, the UE 204 scans the Rx beam 3 (as per the determined scan order) to detect the cell ID of the BS/cell 202 by determining the PSS and SSS in the received signal on the Rx beam 3. If the UE 204 does not determine the PSS and SSS in the signal received on the Rx beam 3, the UE 204 scans the signal received on the Rx beam 2 (as per the scan order) to detect the cell ID of the BS/cell 202 by determining the PSS and SSS in the received signal on the Rx beam 2.

Alternatively, the UE 204 combines the Rx beam 1, and the Rx beam 3 to form the combined beam set, if the UE 204 does not detect a valid cell ID using any of the Rx beam 1, and the Rx beam 3 individually. The UE 204 performs the cell search using the combined beam set (that includes the Rx beam 1, and the Rx beam 3) to detect the cell ID. If the UE 204 does not detect a valid cell ID using the combined beam set (that includes the Rx beam 1, and the Rx beam 3), the UE 204 performs the cell search using the selected Rx beam 2 individually. If the UE 204 does not detect a valid cell ID using the selected Rx beam 2 individually, the UE 204 combines the Rx beam 1, the Rx beam 3, and the Rx beam 2 to form the combined beam set. The UE 204 then performs the cell search using the combined beam set (that includes the Rx beam 1, the Rx beam 3, and the Rx beam 2) to detect the cell ID. If the UE 204 does not detect the cell ID using any of the selected Rx beams or using the combined beam sets using any one of the combinations, the UE 204 may terminate the cell search in the received direction of the signal.

In an embodiment, the UE 204 may perform the beam scheduling and the beam combining with respect to absolute radio-frequency channel number (ARFCNs). The ARFCNs can be unique numbers that specify reference frequencies at which the PSS and the SSS can be present in the received signal. The ARFCNs for the mmWave based communication network 200 may be defined in 3GPP specification 38.101-1 and 38.101-2. The UE 204 may obtain an ARFCN list including the ARFCNs, and associated location data, when registering information about the SIM with the mmWave based communication network 200 and store the obtained ARFCN list. When the UE 204 has to perform the cell search, the UE 204 retrieves the stored ARFCN list by initiating an initial cell search on the associated SIM. The UE 204 then determines an order of the ARFCNs included in the ARFCN list for the cell search randomly. When determining the order of the ARFCNs, the UE 204 scans the ARFCN that is determined first in the scan order. For the scanned ARFCN, the UE 204 performs coarse frequency estimation, and correction using a Cyclic Prefix (CP) correlation in parallel with the beam scheduling and/or the beam combining for the scanned ARFCN. The CP correlation can be performed as a coarse frequency step. In an embodiment, the CP correlation can be performed to correct the fractional frequency offset using CP. The CP can be a code that has been prefixed to the OFDM symbols of the signal, with a repetition at an end of the OFDM symbols. The UE 204 thereafter performs the cell search for the scanned ARFCN using the beam scheduling and/or the beam combining to detect the cell ID of the BS/cell 202. If the UE 204 does not detect the cell ID of the BS 202 with respect to the scanned ARFCN, the UE 204 recursively scans the subsequent ARFCN according to the determined scan order and performs the cell search using the beam scheduling method and/or the beam combining method to detect the cell ID of the BS with respect to the scanned subsequent ARFCN, until all the determined ARFCNs are scanned or the cell ID is detected. If the cell ID is not detected even after scanning all the ARFCNs according to the determined scan order, the UE 204 may terminate the cell search in the received orientation of the signal.

In an embodiment, when detecting the cell ID using the beam scheduling and/or the beam combining with respect to at least one ARFCN, the UE 204 may further check if the BS/cell 202 associated with the detected cell ID satisfies a cell selection criterion (S-criterion). The S-criterion may be a pre-condition/criterion that can be used by the UE 204 to determine if the detected BS/cell 202 is suitable for establishing the new connection or for the handover or cell reselection. In an embodiment, the S-criterion can be defined in accordance with the 3GPP specification 38.304. Examples of the S-criterion for establishing the new connection can be, but not limited to, defined signal measurements for the specific BS/cell 202 (for example Reference Signal Received Power (RSRP)), or the like. Examples of the S-criterion for handover, can be, but not limited to, relative comparisons of the signal measurements, relative comparison of the signal to noise ratio (SNR), relative comparison of the power metric, and so on.

If the BS/cell 202 associated with the detected cell ID satisfies the S-criterion, the UE 204 establishes the new connection with the corresponding BS 202 or initiates the handover to the corresponding BS 202. If the BS/cell 202 associated with the detected cell ID does not satisfy the S-criterion, the UE 204 checks if all the ARFCNs have been scanned in their determined order. If all the determined ARFCNs have not been scanned, the UE 204 recursively scans the at least one determined ARFCN, performs the cell search using the beam scheduling method and/or the beam combining method to detect the cell ID of the BS with respect to the scanned at least one determined ARFCN, and checks if the BS/cell 202 associated with the detected cell ID satisfies with the S-criterion, until a detected BS/cell 202 satisfies the S-criterion or all remaining ARFCNs are scanned. If the BS/cell 202 associated with the detected cell ID does not satisfy the S-criterion for all of the determined ARFCNs, the UE 204 may terminate the cell search process in the received direction of the signal.

In an embodiment, the UE 204 may select at least one ARFCN from the ARFCN list for performing the cell search. The UE 204 performs beam scheduling to select the Rx beams and schedule the Rx beams for all the ARFCNs present in the ARFCN list. The UE 204 then selects the ARFCNs from the ARFCN list and determines an order of the selected ARFCNs for the cell search. In an embodiment, the UE 204 may select the ARFCNs based on the power metric associated with the ARFCNs. The power metric of the ARFCNs can be measured using the at least one parameter such as, but not limited to, time domain average power estimate, frequency domain power estimate, AGC gain, and so on. When selecting and determining the ARFCNs, the UE 204 scans the selected ARFCNs one after the other as per the associated determined order and performs the cell search by performing the beam scheduling and/or the beam combining with respect to the scanned ARFCNs. When detecting the cell ID with respect to the at least one selected ARFCN, the UE 204 checks if the BS/cell 202 satisfies the S-criterion. If the BS/cell 202 satisfies the S-criterion, the UE 204 establishes the new connection with the corresponding BS 202 or initiates the handover to the corresponding BS 202. If the BS/cell 202 that has been detected with respect to any of the selected ARFCNs does not satisfy the S-criterion, the UE 204 terminates the cell search process in the specific orientation. Alternatively, if the UE 204 does not detect the cell ID of the BS/cell 202 even after performing the cell search using the beam scheduling and/or beam combining for all the selected ARFCNs individually, the UE 204 terminates the cell search process in the specific orientation.

In an embodiment, the UE 204 can perform the cell search while connected and detects neighbour BS/cell 202 for performing the handover. The UE 204 receives a neighbour cell information list from the serving BS/cell 202. The neighbour cell information list includes information about the neighbour cells/BSs 202. The UE 204 checks if all the neighbour cells/BSs 202 present in the neighbour information list have been scanned. If all the neighbour cells/BSs 202 present in the neighbour cell information list have been scanned, the UE 204 terminates the cell search process. If the all the neighbour cells/BSs 202 present in the neighbour information list have not been scanned, the UE 204 recursively scans the neighbour cell/BS by fetching information about the neighbour cell/BS 202 from the neighbour cell information list, sets the ARFCN for the fetched cell, and performs the cell search using the beam scheduling method and/or the beam combining method to detect the cell ID with respect to the fetched neighbour cell/BS, until the cell ID is detected or all the neighbour cells/BSs 202 are scanned. Thus, the UE 204 can perform the neighbour cell search faster with optimized performance.

FIG. 2A shows exemplary units of the communication network 200, but it is to be understood that other embodiments are not limited thereon. In other embodiments, the communication network 200 may include less or more number of units. Further, the labels or names of the units are used only for illustrative purpose and does not limit the scope of the embodiments herein. One or more units can be combined together to perform same or substantially similar function in the communication network 200.

Figure 3:
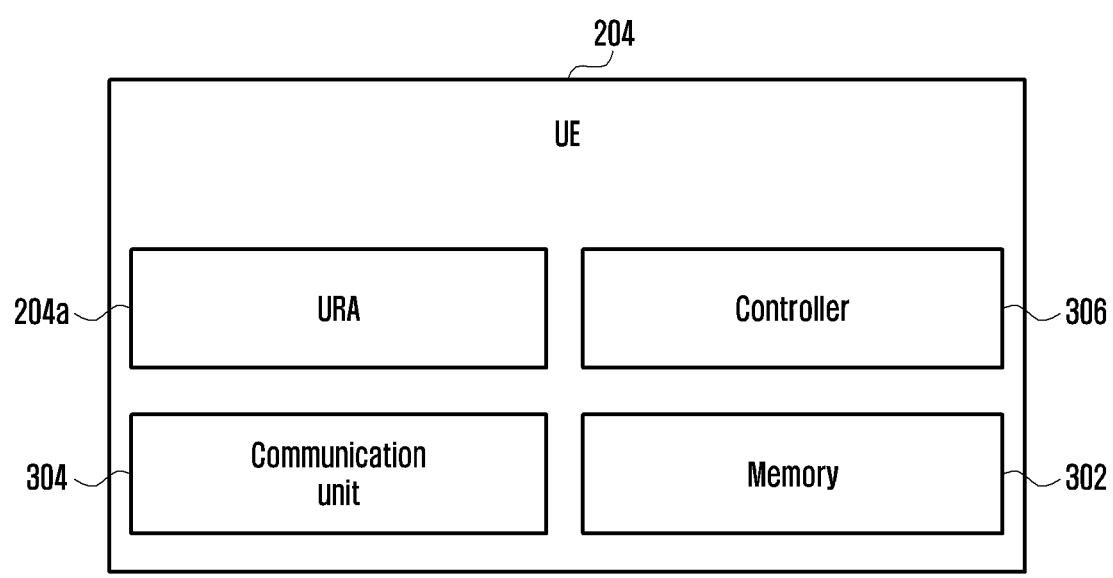
FIG. 3 is a block diagram depicting various components of the UE for performing the cell search, according to an embodiment as disclosed herein.

FIG. 3 is a block diagram depicting various components of the UE 204 for performing the cell search, according to an embodiment as disclosed herein.

The UE 204 includes the URA 204a, a memory 302, a communication unit 304, and a controller 306. The UE 204 may also include a processing circuitry, an Input/Output (I/O) module, a display, and so on (not shown).

The URA 204a includes the one or more antenna elements 204b, which can be arranged in the grid. The antenna elements 204b can be used to form the Rx beams with different widths, so that the UE 204 can receive the signals from the BS 202 at the formed Rx beams.

The memory 302 can store at least one of the information about the antenna elements, the ARFCN list, the neighbour cell information list, the S-criterion, reference/local PSS sequences, reference/local SSS sequences, and so on. Examples of the memory 302 can be, but not limited to, NAND, embedded Multi Media Card (eMMC), Secure Digital (SD) cards, Universal Serial Bus (USB), Serial Advanced Technology Attachment (SATA), solid-state drive (SSD), and so on. Further, the memory 302 may include one or more computer-readable storage media. The memory 302 may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 302 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in Random Access Memory (RAM) or cache).

The communication unit 304 can be configured to enable the UE 204 to communicate with at least one BS 202 over the mmWave channel 206.

The controller 306 can be at least one of a single processor, a plurality of processors, multiple homogeneous or heterogeneous cores, multiple Central Processing Units (CPUs) of different kinds, microcontrollers, special media, and other accelerators. The controller 306 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The controller 306 can be configured to control functions of the antenna elements 204b of the URA 204a to form the Rx beams in the specified directions/orientations for receiving the signals corresponding to the at least one Tx beam from the at least one BS 202. In an embodiment, the controller 306 controls the phase excitation on the antenna elements 204b of the URA 204a to steer/form the Rx beams from the URA 204*a*. Controlling the phase excitation involves changing a phase of the antenna elements of the URA 204*a*.

The controller 306 can be configured to perform the cell search to detect the BS/cell 202 using the signals received on the Rx beams. The cell search can be performed for establishing a new connection with the BS/cell 202 present in the vicinity of the UE 204, when the UE 204 is in the initial access state. The cell search can also be performed to detect the neighbour BS/cell 202 for the handover, when the UE 204 is in the connected state. In an embodiment, the controller 306 can perform the cell search using beam scheduling and/or beam combining.

Figure 4:
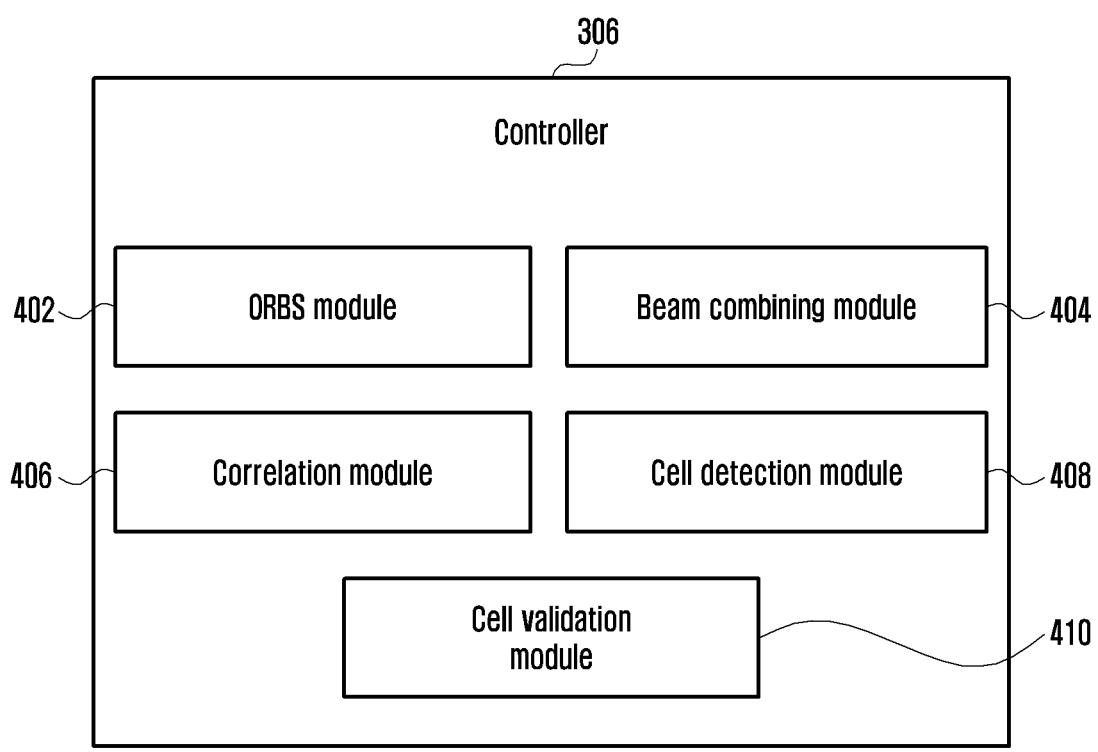
FIG. 4 is a block diagram depicting various components of a controller of the UE for performing the cell search using a beam scheduling and/or beam combining, according to an embodiment as disclosed herein.

As depicted in FIG. 4, the controller 306 includes an optimal receive beam scheduling (ORBS) module 402, a beam combining module 404, a correlation module 406, a cell detection module 408, and a cell validation module 410 for performing the cell search. In an embodiment, the ORBS module 402 and the correlation module 406 can be operated in parallel to measure the power metric associated with the signals received on the Rx beams and to perform the CP correlation.

The ORBS module 402 can be configured to perform beam scheduling. The beam scheduling involves selecting the subset of Rx beams from the plurality/set of Rx beams in the at least one specific orientation, and determining the scan order of the selected Rx beams for the cell search.

The ORBS module 402 receives information about the plurality of Rx beams from the antenna elements 204*b* of the URA 204*a*, which have received the signals from the BS 202. The ORBS module 402 selects/shortlists the subset of Rx beams from the plurality of Rx beams for the cell search. For selecting the Rx beams, the ORBS module 402 measures the power metric associated with the signal received on each Rx beam. The power metric can be measured using the parameters such as, but not limited to, time domain average power estimate, frequency domain power estimate, AGC gain, and so on. The signals received on each beam may have different measures of the power metric. In an example herein, the power metric for the signal received on the $k^{th}$ beam can be measured using the below equation:

$$P^K = \frac{1}{|P|.\Lambda} \sum_{p \in P} \sum_{n=0}^{\Lambda-1} |y_p^k(n)|^2$$

where $P^K$ represents the power metric of the signal received on the $k^{th}$ beam, $\Lambda$ represents a number of time domain samples of the signal received on the Rx beam for measuring the power metric, $P$ represents polarization of the $\Lambda$ samples, and $y_p^k(n)$ represents the signal received on the $k^{th}$ beam.

In an embodiment, the ORBS module 402 can use the power gain applied on each Rx beam by AGC as the power metric to avoid overhead. Lower the AGC gains, higher the power of the signal received on the Rx beam and vice-versa. For example, consider that the UE 204 may be capable of processing the signal of 10 dB. The UE 204 receives a signal of 15 dB at the selected Rx beam 1, and the signal of 5 dB at the selected Rx beam 2. In such a scenario, the AGC applies −5 dB gain on the signal of 15 dB and reduces the power of the signal of +15 dB to 10 dB. The AGC applies+5 dB gain on the signal of 5 dB and increases the power of the signal of 5 dB to 10 dB. Therefore, the UE 204 may capable of the processing the signals.

When measuring the power metric for the signals received on each of the Rx beams, the ORBS module 402 compares the measured power metric of the signal associated with each Rx beam with the measured power metric of the signals associated with the other Rx beams. In an embodiment, the Rx beams associated with the power metric of higher values may be considered as good beams for the cell search, which further increases a probability of detecting the cell/BS 202. In an embodiment, the Rx beams associated with the measured power metric of lower values may be considered as bad beams for the cell search. Thus, the ORBS module 402 selects the subset of Rx beams from the plurality of Rx beams that are associated with the power metric of higher values. In an embodiment, the number of Rx beams selected from the plurality of Rx beams may dynamically vary based on the at least one parameter. Examples of the at least one parameter can be, but not limited to, the difference between power metric of good Rx beams and those of bad Rx beams, the power metric associated with each Rx beam, fixed by UE implementation and so on.

In an embodiment, the ORBS module 402 may consider the Rx beams of different widths jointly for beam scheduling.

In an embodiment, the ORBS module 402 may consider wider Rx beams for beam scheduling. The ORBS module 402 forms the widest beam width set by identifying the width of the Rx beams, which are receiving the signals from at least one BS 202 in the specific orientation. The widest beam width set includes the wider Rx beams. The ORBS module 402 identifies the width of the Rx beams using a beam index mapping stored in the memory 302. The beam index mapping includes a mapping of a beam index with the width of each Rx beam formed by the UE 204. The ORBS module 402 then selects the Rx beams only from the wider Rx beams (present in the widest beam width set) for the cell search, by measuring the power metric associated with each of the wider Rx beams.

In an embodiment, the ORBS module 402 may consider narrow Rx beams for beam scheduling. The ORBS module 402 forms the narrowest beam width set by identifying the width of the Rx beams, which are being receiving the signals from the at least one BS 202 in the specific orientation. The narrowest beam width set includes the narrower Rx beams. The ORBS module 402 then selects the Rx beams only from the narrower Rx beams (present in the narrowest beam width set) for the cell search, by measuring the power metric associated with each of the narrower Rx beams.

When selecting the Rx beams, the ORBS module 402 determines the scan order of the selected Rx beams for the cell search. The scan order may provide information about the sequence of the selected Rx beams for performing the cell search. The ORBS module 402 determines the scan order using the power metric associated with each of the selected Rx beams. In an embodiment, the scan order can be in terms of the decreasing order of the associated power metric of the selected Rx beams.

For example, the ORBS module 402 may select 5 Rx beams from 20 Rx beams, which have received the signals from the at least one BS/cell 202 in the specific orientation. The selected 5 Rx beams may have the power metric of the higher values, compared to the others. The ORBS module 402 then schedules the 5 Rx beams in the decreasing order of their associated power metric.

The ORBS module 402 provides information about the selected Rx beams and the associated determined scan order to the cell detection module 408. The ORBS module 402 also provides the information about the selected Rx beams and the determined scan order of the selected beams to the beam combining module 404.

The beam combining module 404 can be configured to perform the beam combining for the cell search, if the cell detection module 408 does not detect the cell ID of the BS/cell 202 using the at least two selected Rx beams individually in the determined scan order. The beam combining involves combining of the two or more signals received on the selected two or more Rx beams to form the combined beam/beam set. In an embodiment, the beam combining module 404 may use the non-coherent combining to form the combined beam/beam set. The non-coherent combining involves combining the power of the signals received on the selected Rx beams by the ORBS module 402. In an embodiment, the beam combining module 404 may use the coherent combining to form the combined beam/beam set. The coherent combining involves combining the phase and the power of the signals received on the selected Rx beams by the ORBS module 402.

In an embodiment, the beam combining module 404 may combine any number of selected Rx beams for the cell search. The beam combining module 404 may determine a number of selected Rx beams for the beam combining based on the factors such as, but not limited to, complexity-performance gain trade off, hardware requirements, memory requirements, a total number of beam combinations, and so on. For example, consider that the ORBS module 402 selects the 5 Rx beams for the cell search. In such a case, the beam combining module 404 may combine 3 Rx beams from the selected 5 Rx beams first for the cell search, if the cell detection module 408 does not detect the cell ID using the selected 3 Rx beams individually. If the cell detection module 408 does not detect the cell ID using the combined beam set of 3 Rx beams and the cell detection module 408 does not detect the cell ID using the remaining 2 Rx beams individually and also with other beam combination sets, the beam combining module 404 may combine all the selected Rx beams (i.e. 5 Rx beams) for the cell search. The beam combining module 404 may provide the combined beam/beam set to the cell detection module 408.

In an embodiment, when the UE 204 initiates the cell search during the initial access stage, the ORBS module 402 and/or the beam combining module 404 can be configured to perform the beam scheduling and/or the beam combining with respect to the ARFCNs. The ORBS module 402 fetches the ARFCN list from the memory 302, which includes the ARFCNs assigned to the SIM supported by the UE 204, and the associated location data. The ARFCNS may be assigned by the communication network 200, when the UE 204 registers with the communication network 200. The ARFCNs indicate the reference frequencies at which the SS may be present in the received signals.

After fetching the ARFCNs from the memory 302, the ORBS module 402 determines the scan order of the ARFCN randomly. The ORBS module 402 scans the ARFCN that is determined first in the scan order and performs the beam scheduling to select the Rx beams and determine the scan order of the selected Rx beams for the scanned ARFCN. The ORBS module 402 provides information about the selected Rx beams and the associated scan order of the cell detection module for performing the cell search with respect to the scanned ARFCN. If the cell detection module 408 does not detect the cell ID using the two or more selected Rx beams individually, the ORBS module 402 enables the beam combining module 404 to combine the two or more selected Rx beams to form the combined beam set for the cell search. The beam combining module 404 provides the combined beam set for the scanned ARFCN to the cell detection module 408 to detect the cell ID with respect to the scanned ARFCN. If the cell detection module 408 does not detect the cell ID with respect to the scanned ARFCN, the ORBS module 402 scans the subsequent ARFCN according to the scan order, performs the beam scheduling and/or enables the beam combining module 404 to perform the beam combining for the scanned subsequent ARFCN, and provides the information about the beam scheduling and/or beam combining to the cell detection module 408 to perform the cell search for the scanned ARFCN, until the cell ID is detected with respect to the at least one ARFCN or the completion of scanning of all the ARFCNs.

In an embodiment, the ORBS module 402 can be further configured to select the ARFCNs from the ARFCN list, and determine a scan order of the selected ARFCNs to perform the cell search. After fetching the ARFCN list from the memory 302, the ORBS module 402 scans the signals received on the Rx beams on all the ARFCNs and measures the power metric of the signals received on the Rx beams on all the ARFCNs. The ORBS module 402 then selects a subset of ARFCNs present in the ARFCN list based on the measured power metric associated with Rx beams on all the ARFCNs. When selecting the ARFCNs, the ORBS module 402 determines the scan order of the selected ARFCNs based on the measured power metric. After selecting the ARFCNs and determining the scan order of the selected ARFCNs, the ORBS module 402 scans the selected ARFCN that is first in the scan order and performs the beam scheduling to select the Rx beams and determine the scan order of the selected Rx beams for the scanned ARFCN. The ORBS module 402 provides information about the selected Rx beams and the associated scan order of the cell detection module for performing the cell search with respect to the scanned ARFCN. If the cell detection module 408 does not detect the cell ID using the two or more selected Rx beams individually, the ORBS module 402 enables the beam combining module 404 to combine the two or more selected Rx beams to form the combined beam set for the cell search. The beam combining module 404 provides the combined beam set for the scanned ARFCN to the cell detection module 408 to detect the cell ID with respect to the scanned ARFCN. If the cell detection module 408 does not detect the cell ID with respect to the scanned ARFCN, the ORBS module 402 scans the subsequent selected ARFCN according to the scan order, performs the beam scheduling and/or enables the beam combining module 404 to perform the beam combining for the scanned subsequent ARFCN, and provides the information about the beam scheduling and/or beam combining to the cell detection module 408 to perform the cell search for the scanned ARFCN, until the cell ID is detected with respect to the at least one ARFCN or the completion of scanning of all the selected ARFCNs.

In an embodiment, the ORBS module 402 and/or the beam combining module 404 can be configured to perform the beam scheduling and/or the beam combining based on the neighbor BS/cell information list, when the UE 204 initiates the cell search in the connected state, i.e. while connected to a BS/cell 202. The ORBS module 402 requests the serving BS/cell 202 and obtains the neighbor BS/cell information list. The neighbor BS/cell information list provides the neighbor cells/BSs 202 present in the vicinity of the UE 204. After receiving the neighbor BS/cell information list, the ORBS module 402 determines the scan order of the neighbor cells for the cell search randomly. Once the scan order of the neighbor cells has been determined, the ORBS module 402 performs the beam scheduling to select and schedule the Rx beams for each of the neighbor cells, if the neighbor cells have not already been scanned by the UE 204. The ORBS module 402 further provides information about the selected Rx beams and the associated determined scan order for each of the neighbor cells to the cell detection module 408. If the cell detection module 408 does not detect the cell ID of the BS/cell 202 using the Rx beams determined for any of the neighbor cells individually, the ORBS module 402 provides the information about the selected Rx beams and the associated determined scan order for each of the neighbor cells to the beam combining module 404. The beam combining module 404 combines the signals received on the selected Rx beams for each of the neighbor cells and provides information about the combined beam set for each of the selected neighbor cells to the cell detection module 408 for detecting the cell ID of the BS/cell 202.

The correlation module 406 can be configured to correct the time and fractional frequency offset, as the UE 204 has the time and the frequency offset due to the inaccurate UE clock. In an example herein, the frequency offset can be represented using the below equation with respect to the BS's 202 subcarrier spacing of operation:

$$\in = F\Delta_{sc} + f$$

where $\in$ represents the frequency offset, F represents integer frequency component, $\Delta_{sc}$ represents the subcarrier spacing of the operation, and f represents a remnant/fractional frequency component, where the $f < \Delta_{sc}$.

In an embodiment, the correlation module 406 performs the CP correlation to estimate and correct the remnant/fractional frequency component. The CP correlation involves autocorrelation of the OFDM symbols present in the signals received on the different Rx beams and combination of the different Rx beams coherently and calculating a fractional frequency offset using the phase of the peak of the autocorrelation output. The correlation module 406 then corrects the fractional frequency component. In an embodiment, the remnant frequency component can be estimated using the below equations:

$$r^k(n) = \sum_{p \in P} \sum_{i=0}^{O^{cp}-1} \left(y_p^k(n+i)\right) * y_p^k(n+i+N_{fft})$$

$$r^{cp}(n) = \sum_{k=0}^{(k-1)\left(\frac{\Lambda}{O^s}\right)} \sum_{i=0}^{} r^k(n+i.O^s)$$

$$v = \text{argmax}\{|r^{cp}|\}$$

$$\hat{f} = \frac{-\Delta_{sc} \angle r^{cp}(v)}{2\pi}$$

where $r^k(n)$ represents the CP correlation performed on the $k^{th}$ Rx beam, $r^{cp}$ is correlation value added over all Rx beams over different symbols, $O^{cp}$ represents length of the CP, $O^s$ represents length of the OFDM symbol, $\Lambda$ represents a number of time domain samples of the signal received on the Rx beam (same as the samples used in power metric calculation), and $y_p^k$ represents the signal received on the $k^{th}$ beam. However, the signal after the fractional frequency offset correction has the integer frequency offset, which can be estimated using the PSS.

The cell detection module 408 can be configured to perform the cell search to detect the cell ID of the BS/cell 202. In an embodiment, the cell detection module 408 performs the cell search using the selected Rx beams individually according to their determined scan order, after receiving the selected Rx beams and the associated determined scan order from the ORBS module 402. In an embodiment, the cell detection module 408 performs the cell search using the selected and determined Rx beams for each of the ARFCNs (the selected ARFCNs or all the ARFCNs) or the neighbor cells, after receiving the selected Rx beams and the associated determined scan order from the ORBS module 402 for the ARFCNs or the neighbor cells.

In an embodiment, the cell detection module 408 performs the cell search using the combined beam set, after receiving the combined beam set from the beam combining module 404. In an embodiment, the cell detection module 408 performs the cell search using the combined beam set formed for the ARFCNs (the selected ARFCNs or all the ARFCNs) or the neighbor cells, after receiving the combined beam set from the beam combining module 404 for the ARFCNs or the neighbor cells.

Embodiments herein further explain the PSS correlation and the SSS cross correlation performed on the signal collected on the one Rx beam or the signal corresponding to the combined beam set as an example.

The cell detection module 408 performs the PSS correlation to detect the PSS in the signal received on the selected Rx beam. For detecting the PSS, the cell detection module 408 uses the performed CP correlation and extracts a location of a boundary of the OFDM symbols in the signal received on the determined selected Rx beams. Thereafter the cell detection module 408 initiates the PSS detection either in a frequency domain or in a time domain, as the cell detection module 408 determines the boundary of the OFDM symbols. Embodiments herein are further explained using the detection of the PSS in the time domain as an example; however it may be apparent to a person skilled in the art that the frequency domain can also be considered.

The cell detection module 408 correlates the signal received on the Rx beam with local PSS sequences/reference PSS sequences stored in the memory 302 and obtains peak values with respect to the reference PSS sequences. A number of reference PSS sequences used to correlate with the received signal may vary depending on a type of the communication network 200. In an embodiment, the cell detection module 408 uses three reference PSS sequences to correlate with the signal received on the Rx beam. The cell detection module 408 compares the peak value obtained from the correlation of the signal with respect to each reference PSS sequence with the peak values obtained from the correlation of the signal with respect to other reference PSS sequences. The cell detection module 408 detects the reference PSS sequence associated with the highest peak as the PSS.

In an embodiment herein, the PSS can be detected using the below equation:

$$r_v^k(n) = \sum_{p \in P} \left| \sum_{i=0}^{O^s-1} y_p^k(n+i) . \zeta_v(i) \right|$$

$$\left(\hat{N}_{ID}^{(2)}, \hat{t}_{N_{ID}^{(2)}}\right) = \arg_{(v,n)} \max\{r_v^K(n)\}$$

where $\zeta_v$ represents the reference PSS sequence, and $\hat{N}_{ID}^{(2)}$ is the detected PSS with estimated time offset, $$\hat{t}_{N_{ID}^{(2)}}$$

In addition to the detection of the PSS, the cell detection module 408 estimates and corrects the integer frequency offset. The cell detection module 408 estimates and corrects the integer frequency offset by performing additional correlations on the received signal using reference signals $\zeta_{v,\tilde{F}}$, where $\tilde{F} \in F$ and the F can be a set of integer frequency offset hypothesis. The integer frequency offset hypothesis can be chosen depending on the accuracy of the clock associated with the UE. The cell detection module 408 generates the reference signals $\zeta_{v,\tilde{F}}$ by compensating the reference PSS sequence $\zeta_v$ with an integer frequency offset corresponding to a hypothesis being tested. In an embodiment, the reference signal $\zeta_{v,\tilde{F}}$ can be generated using the below equation:

$$\zeta_{v\tilde{F}}(n) = \zeta_v(n).\exp(\frac{-j2\pi \tilde{F}\Delta_{sc}n}{N_{fft}})$$

For detecting the PSS using the combined beam, the cell detection module 408 correlates each of the signal corresponding to the combined beam set with the reference PSS sequences, incoherently combine the correlations and extracts the peak values with respect to the reference PSS sequences. The cell detection module 408 compares the peak value extracted from the correlation of the combined signal with each of the reference PSS sequences with the peak values extracted from the correlation of the combined signal with the other reference PSS sequences. If the peak value obtained from the correlation of the signal with any of the reference PSS sequences is the highest peak value, the cell detection module 408 determines the corresponding reference PSS sequence as the PSS transmitted from the BS/cell 202. In addition to the detection of the PSS, the cell detection module 408 estimates and corrects the integer frequency offset by correlating the combined signal with the reference signal $\zeta_{v,\tilde{F}}$. In an embodiment, the cell detection module 408 can detect the PSS from the combined beam and corrects the integer frequency offset using the below equations:

$$r_{v\tilde{F}}^{\hat{B}}(n) = \sum_{k \in \hat{B}} \sum_{p \in P} \left| \sum_{i=0}^{O^S-1} y_p^k(n+i).\zeta_{v\tilde{F}}^*(i) \right|$$

$$\left( \hat{N}_{ID}^{(2)}, \hat{t}_{N_{ID}^{(2)}}, \hat{F}, \hat{B} \right) = \arg_{(v,n,\tilde{F},\hat{B})} \max \{ r_{v\tilde{F}}^{\hat{B}}(n) \}$$

where $\hat{F}$ is the estimates integer frequency offset.

After detecting the PSS, the cell detection module 408 can detect the SSS using the signal corresponding to either the determined selected Rx beam or the combined beam in which the cell detection module 408 has detected the PSS. In an embodiment, the cell detection module 408 detects the SSS in the frequency domain.

For detecting the SSS using the signal corresponding to the determined selected Rx beam, the cell detection module 408 performs a frequency domain conversion to convert the received signal from the time domain to the frequency domain. After the frequency domain conversion, the cell detection module 408 derives channel estimates from the detected PSS, and extracts SSS symbols from the SSB included in the OFDM symbols of the signal (from which the PSS is detected). The channel estimates may be used to remove the channel distortions in the signal. The cell detection module 408 equalizes the extracted SSS symbols using the derived channel estimates from the detected PSS and averages samples of the derived channel estimates over a window of neighbours to reduce noise affects. When equalizing the SSS symbols, and to reduce noise, the cell detection module 408 cross-correlates the equalized SSS symbols with reference SSS sequences stored in the memory 302 and extracts the peak values with respect to the reference SSS sequences. In an embodiment, the cell detection module 408 cross correlates the equalized SSS symbols with 336 reference SSS sequences. The cell detection module 408 compares the peak value extracted from the correlation of the SSS symbols with respect to each reference SSS sequence with the peak values extracted from the correlation of the SSS symbols with respect to the other reference SSS sequences. The cell detection module 408 determines the reference SSS sequence as the SSS symbol transmitted by the BS/cell 202, if the peak value extracted with respect to the corresponding reference SSS sequence is the highest peak value, compared to the other peak values. In an embodiment, the cell detection module 408 may store the highest peak value, and a number of peak values (other than the highest peak value) obtained from the correlation of the SSS symbols with the reference SSS sequences in the memory 302, which can be used for validation of the detected cell/BS 202.

For detecting the SSS using the signal corresponding to the combined beam, the cell detection module 408 uses the coherent combining method. The coherent combining method involves combining correlation results associated with the signals of the combined beam. In an embodiment, the cell detection module 408 can detect the peak values with respect to the reference SSS sequences using the below equations:

$$r_v^k = \sum_{p \in P} \sum_{m=0}^{126} (H_p^*(m).Y_{p\xi}^k(m)).(\xi_v^*(m))$$

$$r_v^{\hat{B}} = \sum_{k \in \hat{B}} r_v^k$$

$$\hat{N}_{ID}^{(1)} = \arg_{(v)} \max \{ |r_v^{\hat{B}}| \}$$

where, for the signal received on Rx beam k and polarization p, using the symbol boundary derived from the PSS, the SSS symbols $Y_{p\xi}^k$, are extracted from the SSB after the OFDM frequency domain conversion of $y_p^k$. The symbols are equalized using the channel estimates $H_p$ derived from the PSS symbols. The channel estimate samples can be averaged over a window of neighbours to reduce noise. Correlations corresponding to each SSS hypothesis $\xi_v$ for each SSS Id (0, 1, 2 . . . 335), and outputs from multiple polarization can be combined, where $r_v^k$ represents the correlation for the $k^{th}$ beam for the SSS Id v, $r_v^{\hat{B}}$ represents the correlation combined for the beam set $\hat{B}$ and the SSS Id v, and $\hat{N}_{ID}^{(1)}$ represents the detected SSS.

After detecting the PSS and the SSS, the cell detection module 408 detects the cell ID of the BS/cell 202. The cell detection module 408 can detect the cell ID of the BS/cell 202 using the below equation:

$$\text{cell } ID = 3\hat{N}_{ID}^{(1)} + \hat{N}_{ID}^{(2)}$$

where $\hat{N}_{ID}^{(1)}$ represents the SSS, and $\hat{N}_{ID}^{(2)}$ represents the PSS. The cell detection module 408 provides the detected cell ID to the cell validation module 410.

The cell validation module 410 can be configured to validate the BS/cell 202 corresponding to the detected cell ID. In an embodiment, the cell validation module 410 uses a peak to average power ratio (PAPR) to validate the detected BS/cell 202. The PAPR ratio can be represented as:

$$PAPR = \frac{\text{peak power}}{\text{average power}}$$

where the peak power can be power associated with the highest peak value obtained during the SSS cross correlation, and the average power can be an average power of the peak values (other than the highest peak) that are obtained during the SSS cross correlation.

The cell validation module 410 measures the PAPR value by fetching the peak values that were stored in the memory 302, while performing the SSS correlation. The cell validation module 410 then compares the measured PAPR value with a threshold. The cell validation module 410 may choose the threshold numerically by satisfying a false alarm rate. The false alarm rate may indicate a percentage of noisy peaks passed for the valid cell. The cell validation module 410 may validate the cell using the below equation:

$$V_{\hat{N}_{ID}^{(1)}} = \begin{cases} 1, & \text{if } |r^{\hat{B}}_{\hat{N}_{ID}^{(1)}} \cdot \rho_v^{-1}| \geq \Gamma \\ 0, & \text{Otherwise} \end{cases}$$

where $$V_{\hat{N}_{ID}^{(1)}}$$

is the validity for the detected cell, $\rho_v$ represents an average of peak values of $r_v^{\hat{B}}$ other than the highest peak, $$r^{\hat{B}}_{\hat{N}_{ID}^{(1)}}$$

is the highest peak and $\Gamma$ represents a comparison threshold.

If the detected BS/cell 202 is valid, the cell validation module 410 enables the UE 204 to connect to the corresponding BS/cell 202. If the detected BS/cell 202 is not valid, the cell validation module 410 may instruct the cell detection module 408 to detect the cell ID using the subsequent selected Rx beams/subsequent combinations of the combined beam set.

The cell validation module 410 can also be configured to validate the detected BS/cell 202 based on the S-criterion. The cell validation module 410 fetches the S-criterion defined for the BS/cell 202 from the memory 302. The cell validation module 410 measures the S-criterion associated with the detected BS/cell 202. In an example, measuring the S-criterion can be at least one of measuring the power metric associated with the BS/cell 202, measuring reference signals associated with the BS/cell 202, and so on. The cell validation module 410 compares the measured S-criterion of the detected BS/cell 202 with the stored S-criterion. If the measured S-criterion of the detected BS/cell 202 satisfies the stored S-criterion, the cell validation module 410 enables the UE 204 to connect to the corresponding BS/cell 202. If the measured S-criterion of the detected BS/cell 202 does not satisfy the stored S-criterion, the cell validation module 410 may instruct the cell detection module 408 to detect the cell ID using the subsequent selected Rx beams/subsequent combinations of the combined beam set.

FIG. 3 shows exemplary units of the UE 204, but it is to be understood that other embodiments are not limited thereon. In other embodiments, the UE 204 may include less or more number of units. Further, the labels or names of the units are used only for illustrative purpose and does not limit the scope of the embodiments herein. One or more units can be combined together to perform same or substantially similar function in the UE 204.

Figure 5:
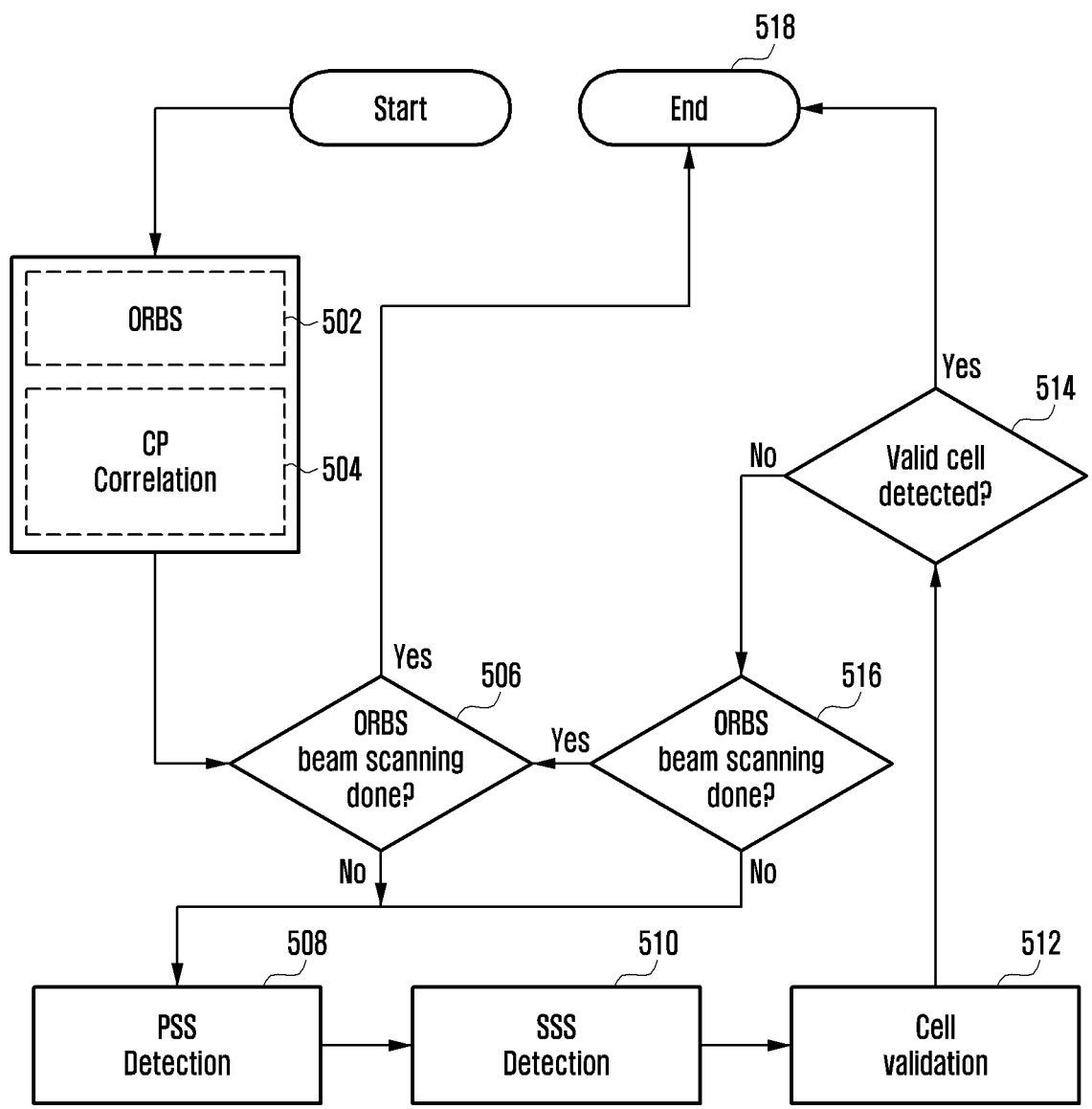
FIG. 5 is an example flow diagram depicting the cell search performed in the mmWave communication network, according to an embodiment as disclosed herein.

FIG. 5 is an example flow diagram depicting the cell search performed in the mmWave communication network 200, according to an embodiment as disclosed herein.

At step 502, the UE 204 performs the beam scheduling/optimal receive beam scheduling (ORBS), when receiving the signals transmitted from the BS 202 on the plurality of Rx beams. The beam scheduling involves selecting the subset of Rx beams from the plurality of Rx beams based on their associated power metric and determining the scan order of the beam selected Rx beams for the cell search.

At step 504, after performing the beam scheduling, the UE 204 performs the CP correlation to synchronize with the BS 202. At step 506, the UE 204 checks if all the selected Rx beams have been scanned to detect the cell ID of the BS/cell 202 and scans the selected Rx beam according to the determined scan order, if the selected Rx beams have not scanned. The UE 204 scans the selected Rx beam according to the determined scan order to collect the signal including the OFDM samples from the selected Rx beam. If all the selected Rx beams have already scanned, at step 518, the UE 204 ends the cell search in the received orientation of the signal.

On collecting the signal from the scanned selected Rx beam, at step 508, the UE 204 detects the PSS from the collected signal by performing the PSS cross correlation. At step 510, the UE 204 detects the SSS from the collected signal, based on the detected PSS. The SSS can be detected by converting the signal from the time domain into the frequency domain, extracting the SSS symbols from the converted signal based on the detected PSS, and performing the SSS cross correlations on the extracted symbol. The UE 204 detects the cell ID using the PSS and the SSS.

At step 512, the UE 204 validates the detected BS/cell 202 using the PAPR method. The UE 204 measures the PAPR based on the detected SSS (corresponding to the detected BS/cell 202) and compares the measured PAPR with the threshold. If the measured PAPR satisfies the threshold, the UE 204 considers the detected BS/cell 202 as valid. If the measured PAPR does not satisfy the threshold, the UE 204 considers that the detected BS/cell as not being valid.

At step 514, the UE 204 checks if the detected BS/cell 202 is valid. If the detected BS/cell 202 is valid, the UE 204 ends the cell search at step 518. If the detected BS/cell 202 is not valid, at step 516, the UE 204 checks whether the beam combining can be performed using the scanned selected Rx beams. If the beam combining can be performed, the UE 204 combines the scanned selected Rx beams to form the combined beam set. At step 506, the UE 204 checks if the combined beam set has already been scanned. If the combined beam set has already been scanned, then UE checks for other individual beam scans at step 506. If the combined beam set has not been scanned, the UE 204 performs the steps 508-514.

If beam combining cannot be performed using the scanned selected Rx beams, the UE 204 performs the steps 506-514 using other individual beams.

Consider an example scenario, where the UE 204 selects 5 Rx beams and determines the order of the selected 5 Rx beams (an Rx beam 4, an Rx beam 3, an Rx beam 2, an Rx beam 5, and an Rx beam 7) for the cell search. In such a scenario, the UE 204 performs the cell search to detect the cell ID of the BS 202 using the Rx beam 4 first. If the cell ID is not detected using the Rx beam 4 individually, the UE 204 performs the cell search using the Rx beam 3 according to the determined scan order. If the cell ID is not detected using the Rx beam 3 individually, the UE 204 performs the cell search using the Rx beam 2 according to the determined scan order. The UE 204 may perform the cell search by performing the beam combining, upon failing the cell search using two or more selected Rx beams individually. In an example herein, when the UE 204 does not detect the cell ID using the Rx beam 4, the Rx beam 3, and the Rx beam 2 individually, the UE 204 performs the beam combining (for example: a tri-beam combining). The tri-beam combining involves combining the scanned Rx beam 4, the Rx beam 3, and the Rx beam 2 to form the combined beam set. The UE 204 performs the cell search using the combined beam set. If the UE 204 does not detect the cell ID using the combined beam set, the UE 204 performs the cell search using the Rx beam 5. If the UE 204 does not detect the cell ID using the Rx beam 5 individually, the UE 204 combines the scanned Rx beam 4, the Rx beam 2, the Rx beam 3, and the Rx beam 5 to form the combined beam set. In an example herein, the combined beam set may include combinations such as {(4, 3, 5), (4, 2, 5), (3, 2, 5)}. The UE 204 performs the cell search using the combined beam set of the Rx beams 4, 2, 3, and 5. If the UE 204 does not detect the cell ID using the combination of the scanned Rx beam 4, the Rx beam 2, the Rx beam 2, and the Rx beam 5, the UE 204 performs the cell search using the Rx beam 7 individually. If the UE 204 does not detect the cell ID using the Rx beam 7 individually, the UE 204 combines the scanned Rx beam 4, 2, 3, 5, and 7 to form the combined beam set. The UE 204 performs the cell search using the combined beam set of the Rx beams 4, 2, 3, 5 and 7. If the UE 204 does not detect the cell ID using the combination of all the scanned Rx beams, the UE 204 terminates the cell search.

Figure 6:
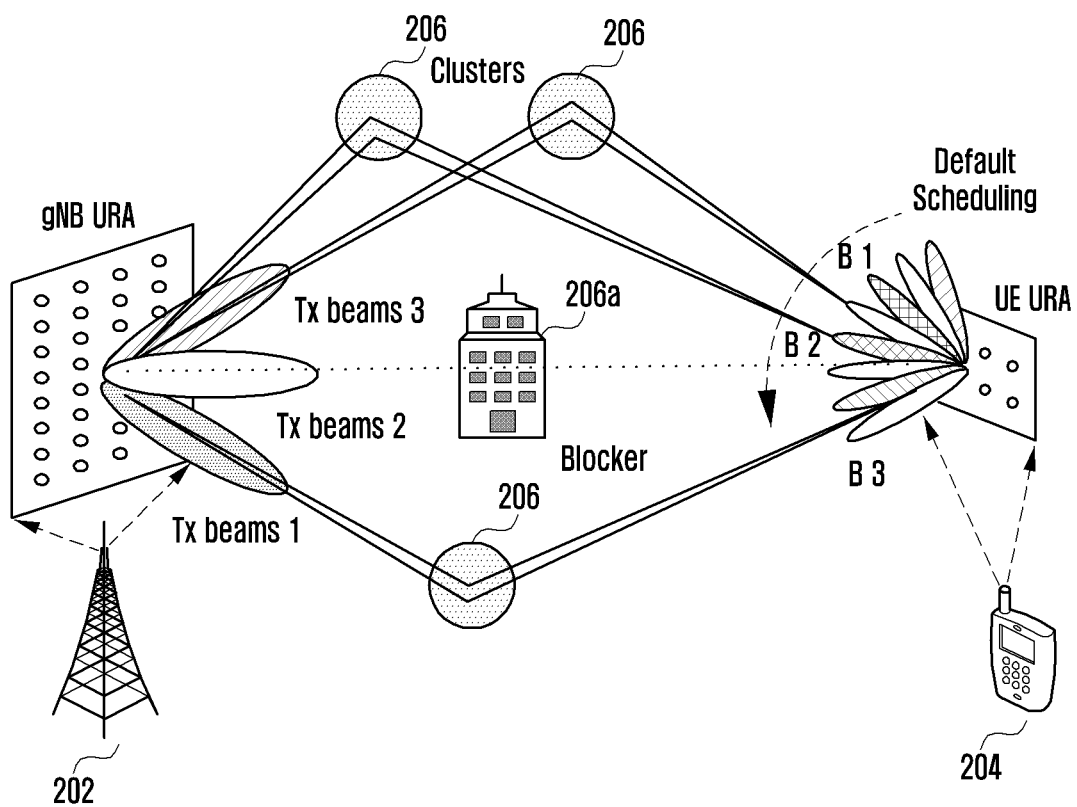
FIG. 6 depicts an example mmWave communication network 200, where the cell search is performed using the beam scheduling and/or beam combining, according to an embodiment as disclosed herein.

FIG. 6 depicts an example mmWave communication network 200, where the cell search is performed using the beam scheduling and/or beam combining, according to an embodiment as disclosed herein.

Consider the example scenario as depicted in FIG. 6, where the BS 202 transmits the signals in three Tx beams (the Tx beam 1, the Tx beam 2, and the Tx beam 3) to the UE 204 over the transmit paths of the mmWave channel 206. The UE 204 receives the signals corresponding to the Tx beam 1, the Tx beam 2 and the Tx beam 3 at 8 Rx beams (Rx beam 1-Rx beam 8) in the specific orientation. It should be noted that embodiments herein are further explained considering the 8 Rx beams for example, but it may be apparent to a person skilled in the art that any number of the Rx beams covering 360° space in three dimensions can be considered. The received signals may be reflected by the one or more clusters 206a present in the mmWave channel 206.

In such a scenario, the UE 204 may perform the cell search to detect the BS/cell 202 using beam scheduling. After receiving the signals at the 8 Rx beams, the UE 204 measures the power metric associated with each of the 8 Rx beams. Based on the measured power metric, the UE 204 selects the subset of Rx beams from the 8 Rx beams. In an example herein, the UE 204 may select 3 Rx beams (the Rx beam 1, the Rx beam 2, and the Rx beam 3) from the 8 Rx beams for the cell search, as the 3 Rx beams may each have a higher power metric compared to the other 5 Rx beams. When selecting the 3 Rx beams, the UE 204 schedules the 3 Rx beams in the decreasing order of the power metric for the cell search. In an example herein, the UE 204 may arrange the Rx beam 1 first and followed by the Rx beam 3, and the Rx beam 2 in the scan order, as the Rx beam 1 may have the higher power metric compared to the Rx beams 2 and 3, and the Rx beam 3 may have the higher power metric compared to the Rx beam 2. The UE 204 then performs the cell ID by scanning the Rx beam 1 that is determined first to detect the cell ID of the BS/cell 202. If the UE 204 does not detect the cell ID using the Rx beam 1, the UE 204 scans the Rx beam 3 (as per the determined scan order) to detect the cell ID of the BS/cell 202. If the UE 204 does not detect the cell ID of the BS/cell 202, the UE 204 scans the Rx beam 2 to detect the cell ID of the BS/cell 202. Thus, performing the cell search using the beam scheduling may decrease latency of the cell search, as total time required to scan the selected Rx beams may be less. In an example herein, the UE 204 may require only 60 ms (20 ms for each Rx beam) to scan the selected Rx beams.

In an example herein, consider that the UE 204 does not detect the cell ID of the BS/cell 202 using the selected 3 Rx beams individually in the associated determined scan order. In such a case, the UE 204 combines the two or more of the selected Rx beams to form the combined beam set. Combining the two or more of the selected Rx beams refers to combining the signals received on the two or more selected Rx beams. In an example herein, consider that the UE 204 combines the Rx beam 1, the Rx beam 2, and the Rx beam 3 and performs the cell search using the combined beam set of the Rx beams 1, 2, and 3. Thus, switching to the beam combining upon failing the cell search using the selected Rx beams individually yields power gain (for example; up to 2 dB), which can be significant for coverage enhancement.

Figure 7:
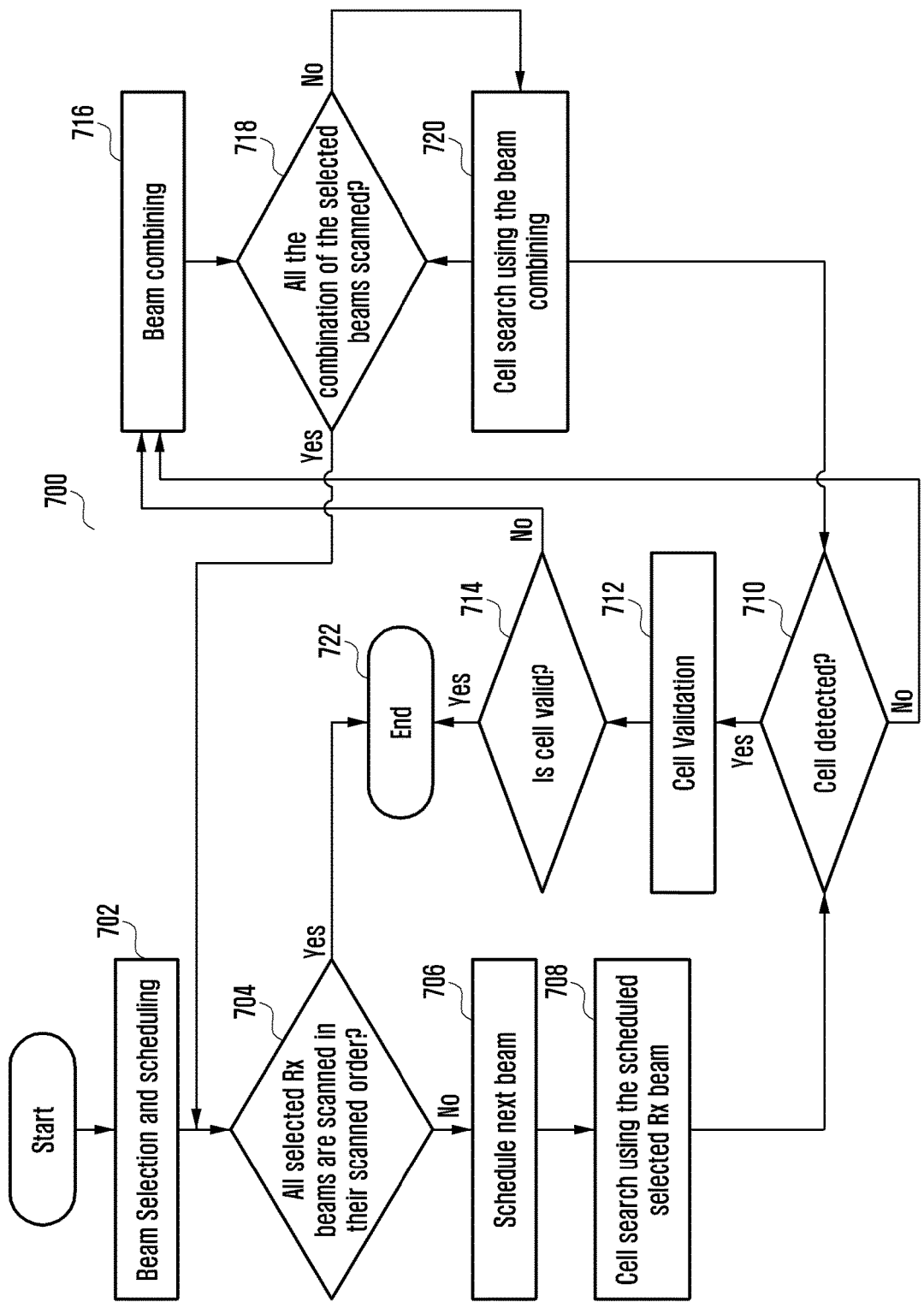
FIG. 7 is an example flow diagram depicting a method for performing the cell search using the beam scheduling and/or beam combining in the mmWave communication network, according to an embodiment as disclosed herein.

FIG. 7 is an example flow diagram 700 depicting the cell search performed using the beam scheduling and/or beam combining in the mmWave communication network 200, according to an embodiment as disclosed herein.

At step 702, the UE 204 selects the Rx beams from the plurality of Rx beams and determines the scan order of the Rx beams for the cell search, after receiving the signals from the BS 202 on the plurality of Rx beams.

At step 704, the UE 204 checks if all the selected beams have already been scanned in the determined scan order for the cell search. If all the selected Rx beams have already been scanned for the cell search and the cell ID has not been detected, at step 722, the UE 204 terminates the cell search. If all the selected beams have not been scanned, at step 706, the UE 204 scans the next Rx beam as per the determined scan order, and collects the signal including the OFDM symbols from the scanned selected Rx beam.

At step 708, the UE 204 performs the cell search using the collected signal from the scanned Rx beam. The UE 204 determines the PSS and the SSS from the collected signal and detects the cell ID of the BS/cell 202 using the PSS and the SSS. At step 710, the UE 204 checks if the BS/cell or the cell ID has been detected using the signal collected from the scanned Rx beam. If the BS/cell 202 has been detected, at step 712, the UE 204 validates the detected cell ID or the BS/cell 202 based on the PAPR method. At step 714, the UE 204 checks if the detected cell ID is valid. If the detected cell ID is valid, at step 722, the UE ends the cell search.

If the BS/cell 202 has not been detected using the signal collected from the scanned Rx beam (at step 710) or if the detected cell ID is not valid (at step 714), the UE 204, at step 716, checks if the beam combining can be performed and combines the scanned selected Rx beams to form the combined beam set, if the beam combining can be performed. At step 718, the UE 204 checks if the combined beam set has already been scanned. If the combined beam set has not been scanned, at step 720, the UE 204 performs the cell search using the combined beam set and performs the steps 710-714. The cell search involves detecting the cell ID by identifying the PSS and the SSS in the signals corresponding to the combined beam set. At step 710, the UE 204 checks if the BS/cell or the cell ID has been detected using the signals corresponding to the combined beam set. If the BS/cell 202 has been detected, at step 712, the UE 204 validates the detected BS/cell 202 based on the PAPR method. At step 714, the UE 204 checks if the detected cell ID is valid. If the detected cell ID is valid, at step 722, the UE ends the cell search.

If the detected cell ID is not valid (at step 714), or the combined beam set has already been scanned (at step 718) or the UE 204 cannot form the combined beam set (at step 716), the UE 204 repeats the steps 704-720 until the cell ID is detected or all the signals corresponding to all the selected Rx beams have been scanned, or all the signals corresponding to all the selected Rx beams have been combined and scanned for the cell search. The various actions in method 700 may be performed in the order presented, in a different order or simultaneously. Further, in some embodiments, some operations shown in FIG. 7 may be omitted.

As shown in FIG. 7, one or more embodiments disclosed herein performs the cell search using the beam scheduling and/or beam combining in the mmWave communication network 200 to decrease cell search latency by mitigating a requirement of scanning all the plurality of beams.

Figure 8:
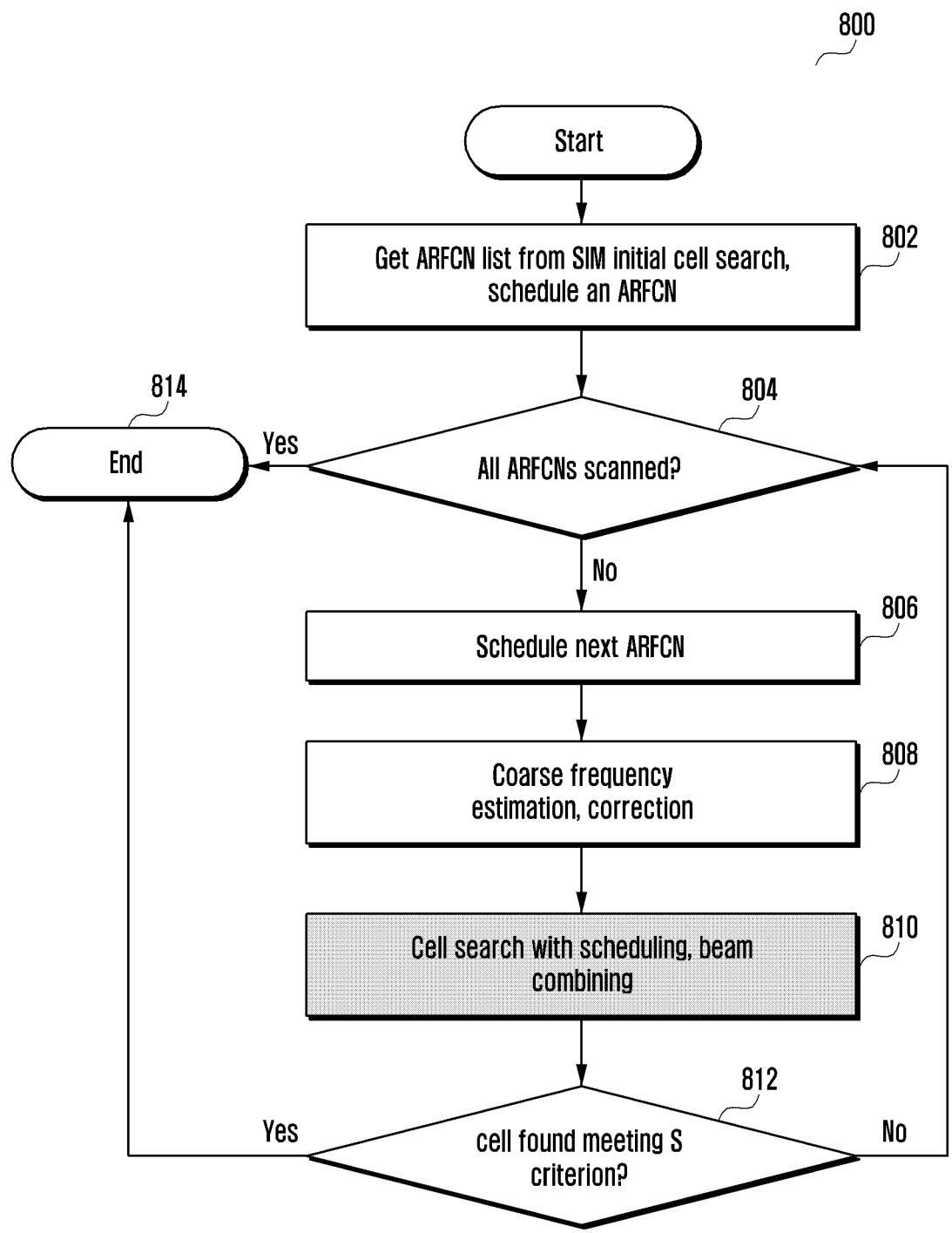
FIG. 8 is an example flow diagram depicting the cell search performed with respect to absolute radio frequency channel numbers (ARFCNs), according to an embodiment as disclosed herein.

FIG. 8 is an example flow diagram 800 depicting the cell search performed with respect to the ARFCNs, according to an embodiment as disclosed herein.

At step 802, the UE 204 fetches the ARFCN list assigned to the SIM from the memory 302 and schedules the ARFCNs present in the ARFCN list for the cell search randomly.

At step 804, the UE 204 checks if all the ARFCNs have been scanned for the cell search. If all the ARFCNs have already been scanned for the cell search, at step 814, the UE 204 ends the cell search. If all the ARFCNs have not been scanned, at step 806, the UE 204 scans the ARFCN according to its scan order. At step 808, the UE 204 performs the coarse frequency estimation and correction for the scanned ARFCN. At step 810, the UE 204 performs the cell search using the beam scheduling and/or the beam combining to detect the cell ID of the BS/cell 202 with respect to the scanned ARFCN. Thus, the beam scheduling incurs zero overhead, as the UE 204 may perform the beam scheduling in parallel with the coarse frequency offset stage, which has to be performed during the initial cell search.

At step 812, the UE 204 checks if the cell ID of the BS/cell 202 has been detected with respect to the scanned ARFCN. If the cell ID of the BS/cell 202 has been detected, the UE 204 measures the S-criterion of the detected BS/cell 202 and compares the measured S-criterion with the S-criterion stored for the BS/cell 202 in the memory 302. If the measured S-criterion of the BS/cell 202 satisfies the stored S-criterion, at step 814, the UE 204 ends the cell search.

If the cell ID of the BS/cell 202 has not been detected with respect to the scanned ARFCN, or the S-criterion of the measured detected BS/cell 202 does not satisfy the stored S-criterion, the UE 204 repeats the steps 804-812 until the detected BS/cell 202 satisfies the S-criterion or all the ARFCNs have been scanned for the cell search. Thus, multiple cells can be detected using the S-criterion. The various actions in method 800 may be performed in the order presented, in a different order or simultaneously. Further, in some embodiments, some operations shown in FIG. 8 may be omitted.

Figure 9:
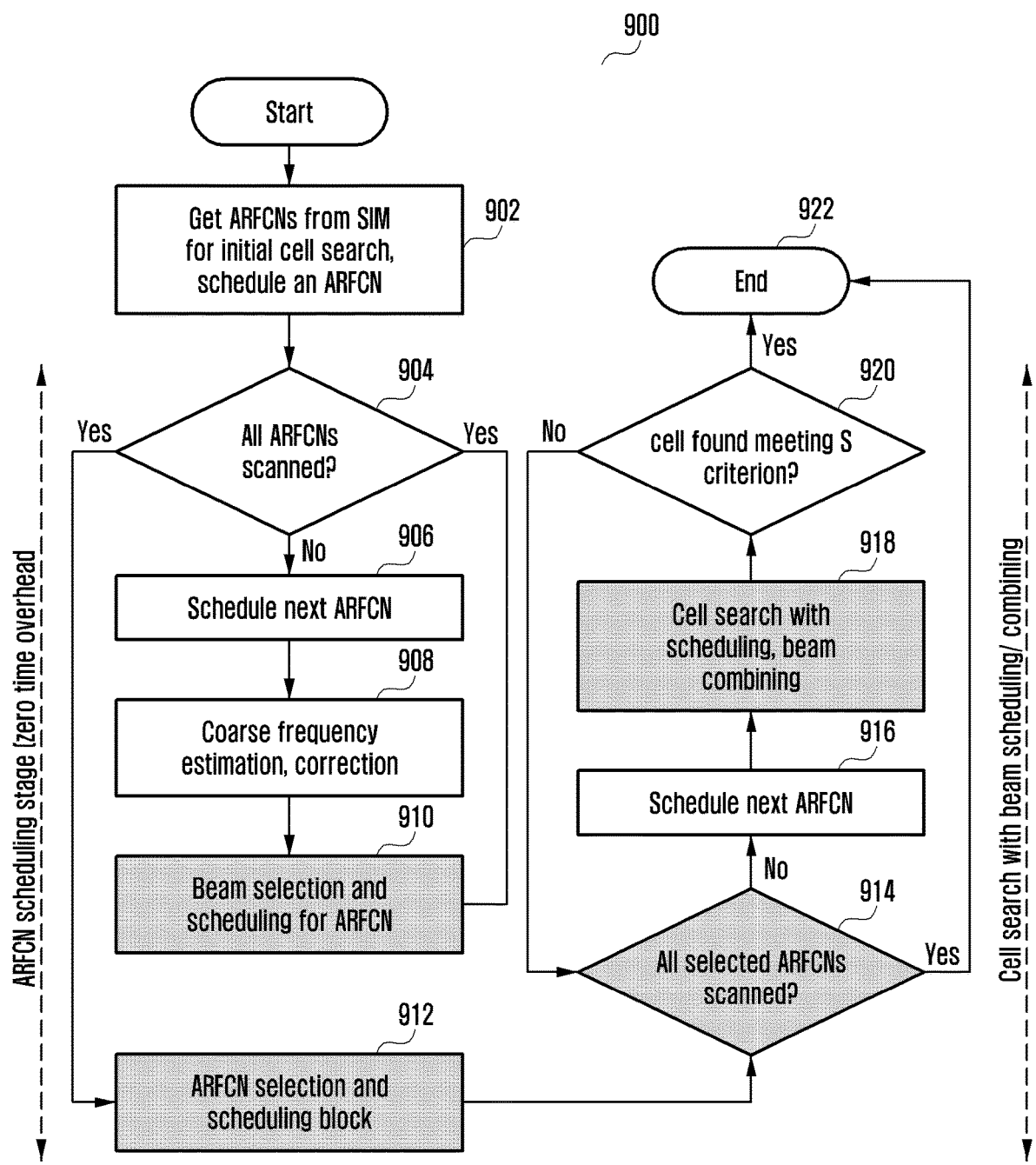
FIG. 9 is an example flow diagram depicting the cell search performed by optimizing a scheduling of the ARFCNs, according to an embodiment as disclosed herein.

FIG. 9 is an example flow diagram 900 depicting the cell search performed by optimizing the scheduling of the ARFCNs, according to an embodiment as disclosed herein.

At step 902, the UE 204 fetches the ARFCN list assigned to the SIM from the memory 302 and schedules the ARFCNs present in the ARFCN list for the cell search.

At step 904, the UE 204 checks if all the ARFCNs have been scanned for the cell search. If all the ARFCNs have already been scanned for the cell search, the UE 204 performs the step 912. If all the ARFCNs have not been scanned for the cell search, at step 906, the UE 204 scans the ARFCN according to its determined scan order. At step 908, the UE 204 performs coarse frequency estimation and correction for the scanned ARFCN. At step 910, the UE 204 selects the Rx beams and schedules the order of the Rx beams for the scanned ARFCN. The UE 204 further repeats the steps 904-910 until the Rx beams have been selected and scheduled for all the ARFCNs.

After selecting and scheduling the Rx beams for all the ARFCNs, at step 912, the UE 204 selects the subset of ARFCNs from the scanned ARFCNs and schedules the scan order of the selected ARFCNs.

At step 914, the UE 204 checks if all the selected ARFCNs have been scanned according to their determined scan order. If all the selected ARFCNs have been scanned, at step 922, the UE 204 ends the cell search. If all the selected ARFCNs have not been scanned, at step 916, the UE 204 scans the ARFCN according to its determined scan order. At step 918, the UE 204 performs the cell search using the beam scheduling and/or the beam combining to detect the cell ID of the BS/cell 202 with respect to the scanned selected ARFCN.

At step 920, the UE 204 checks if the cell ID of the BS/cell 202 has been detected with respect to the current ARFCN. If the cell ID of the BS/cell 202 has been detected, the UE 204 measures the S-criterion of the detected BS/cell 202 and compares the measured S-criterion with the S-criterion stored for the BS/cell 202 in the memory 302. If the measured S-criterion of the BS/cell 202 satisfies the stored S-criterion, the UE 204, at step 922, the UE 204 ends the cell search.

If the cell ID of the BS/cell 202 has not been detected with respect to the scanned selected ARFCN, or the S-criterion of the measured detected BS/cell 202 does not satisfy the stored S-criterion, the UE 204 repeats the steps 914-920 until the detected BS/cell 202 satisfies the S-criterion or all the selected ARFCNs have been scanned for the cell search. Thus, multiple cells can be detected using the S-criterion. The various actions in method 900 may be performed in the order presented, in a different order or simultaneously. Further, in some embodiments, some operations shown in FIG. 9 may be omitted.

Figure 10:
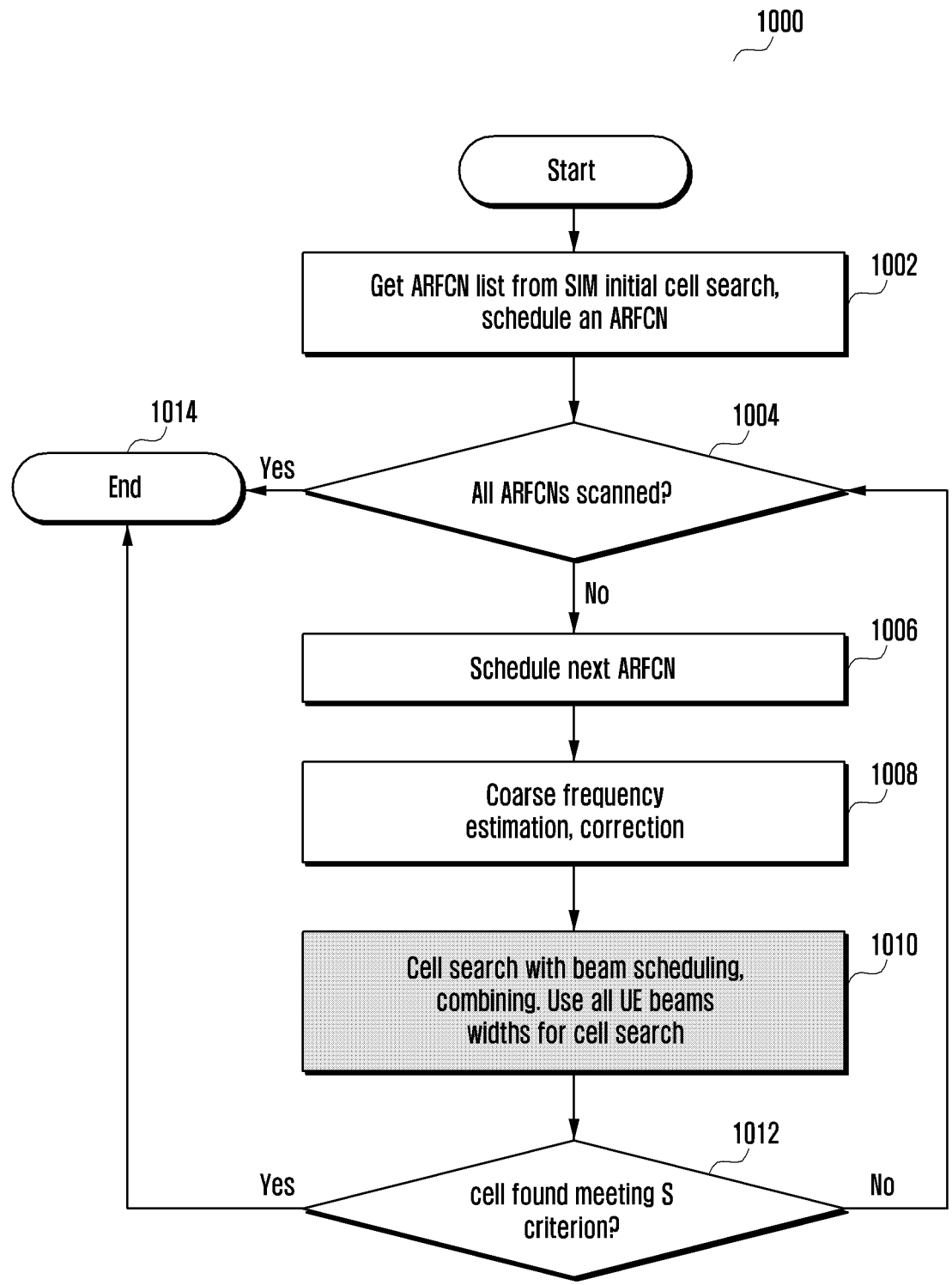
FIG. 10 is an example flow diagram depicting the cell search performed by considering the Rx beams of different widths and the S-criterion, according to an embodiment as disclosed herein.

FIG. 10 is an example flow diagram 1000 depicting the cell search performed by considering the Rx beams of different widths and the S-criterion, according to an embodiment as disclosed herein.

At step 1002, the UE 204 fetches the ARFCN list assigned to the SIM from the memory 302 and schedules the ARFCNs present in the ARFCN list for the cell search.

At step 1004, the UE 204 checks if all the ARFCNs have been scanned for the cell search. If all the ARFCNs have already been scanned for the cell search, at step 1014, the UE 204 ends the cell search. If all the ARFCNs have not been scanned, at step 1006, the UE 204 scans the ARFCN according to its scan order. At step 1008, the UE 204 performs the coarse frequency estimation and correction for the scanned ARFCN. At step 1010, the UE 204 performs the cell search using the beam scheduling and/or the beam combining to detect the cell ID of the BS/cell 202 with respect to the scanned ARFCN. In an embodiment, the UE 204 may consider the Rx beams of the different widths jointly for performing the beam scheduling. Thus, considering the Rx beams of the different widths for the beam scheduling may reduce the latency of the cell search and improve the cell search by yielding better S-criterion.

At step 1012, the UE 204 checks if the cell ID of the BS/cell 202 has been detected with respect to the scanned ARFCN. If the cell ID of the BS/cell 202 has been detected, the UE 204 measures the S-criterion of the detected BS/cell 202 and compares the measured S-criterion with the S-criterion stored for the BS/cell 202 in the memory 302. If the measured S-criterion of the BS/cell 202 satisfies the stored S-criterion, the UE 204, at step 1014, the UE 204 ends the cell search.

If the cell ID of the BS/cell 202 has not been detected with respect to the scanned ARFCN, or the S-criterion of the measured detected BS/cell 202 does not satisfy the stored S-criterion, the UE 204 repeats the steps 1004-1012 until the detected BS/cell 202 satisfies the S-criterion or all the ARFCNs have been scanned for the cell search. Thus, multiple cells can be detected using the S-criterion. The various actions in method 1000 may be performed in the order presented, in a different order or simultaneously. Further, in some embodiments, some operations shown in FIG. 10 may be omitted.

Figure 11A:
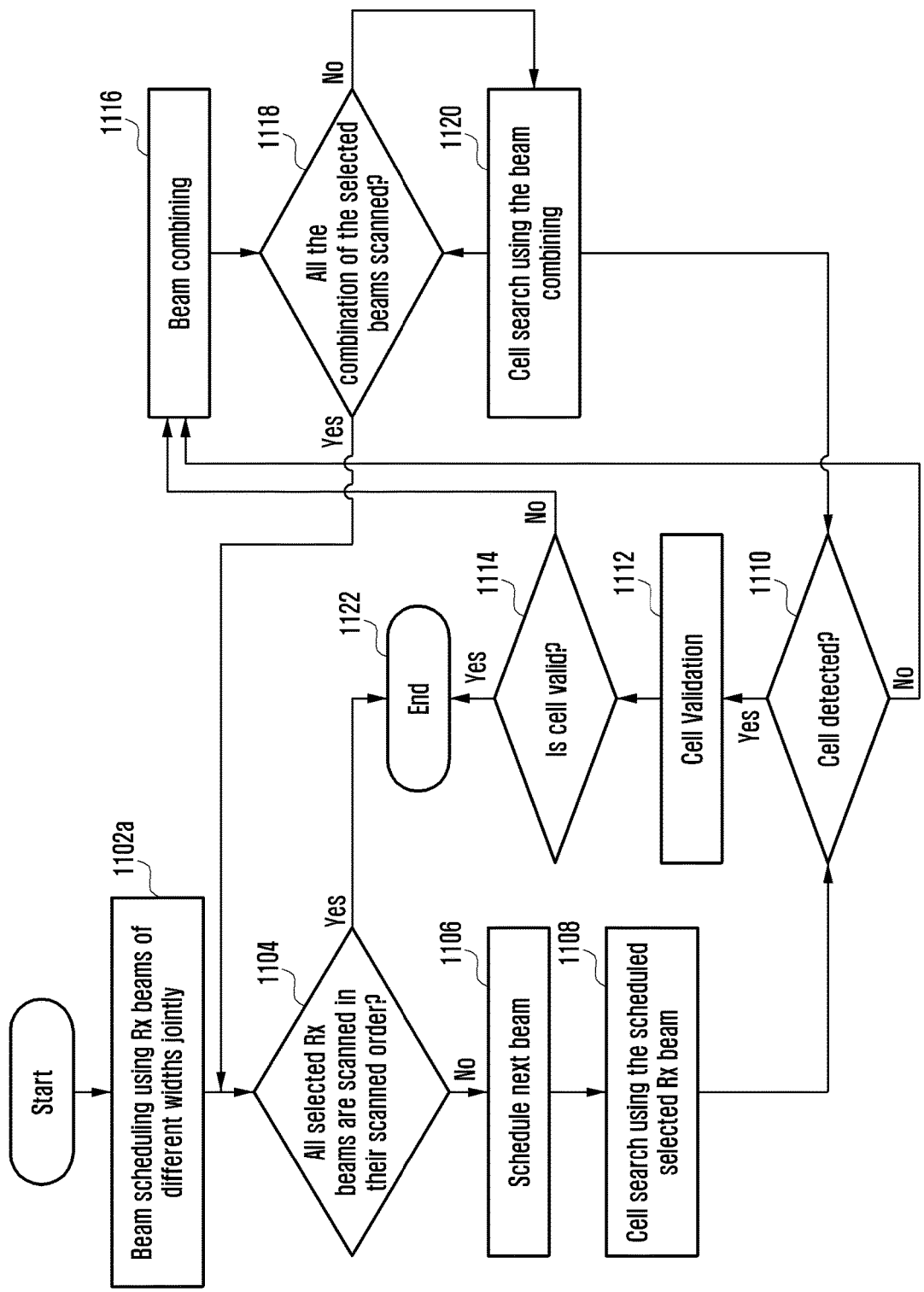
FIGS. 11A and 11B are each example flow diagrams depicting the cell search performed by considering same or different widths of the Rx beams, according to embodiments as disclosed herein.
Figure 11B:
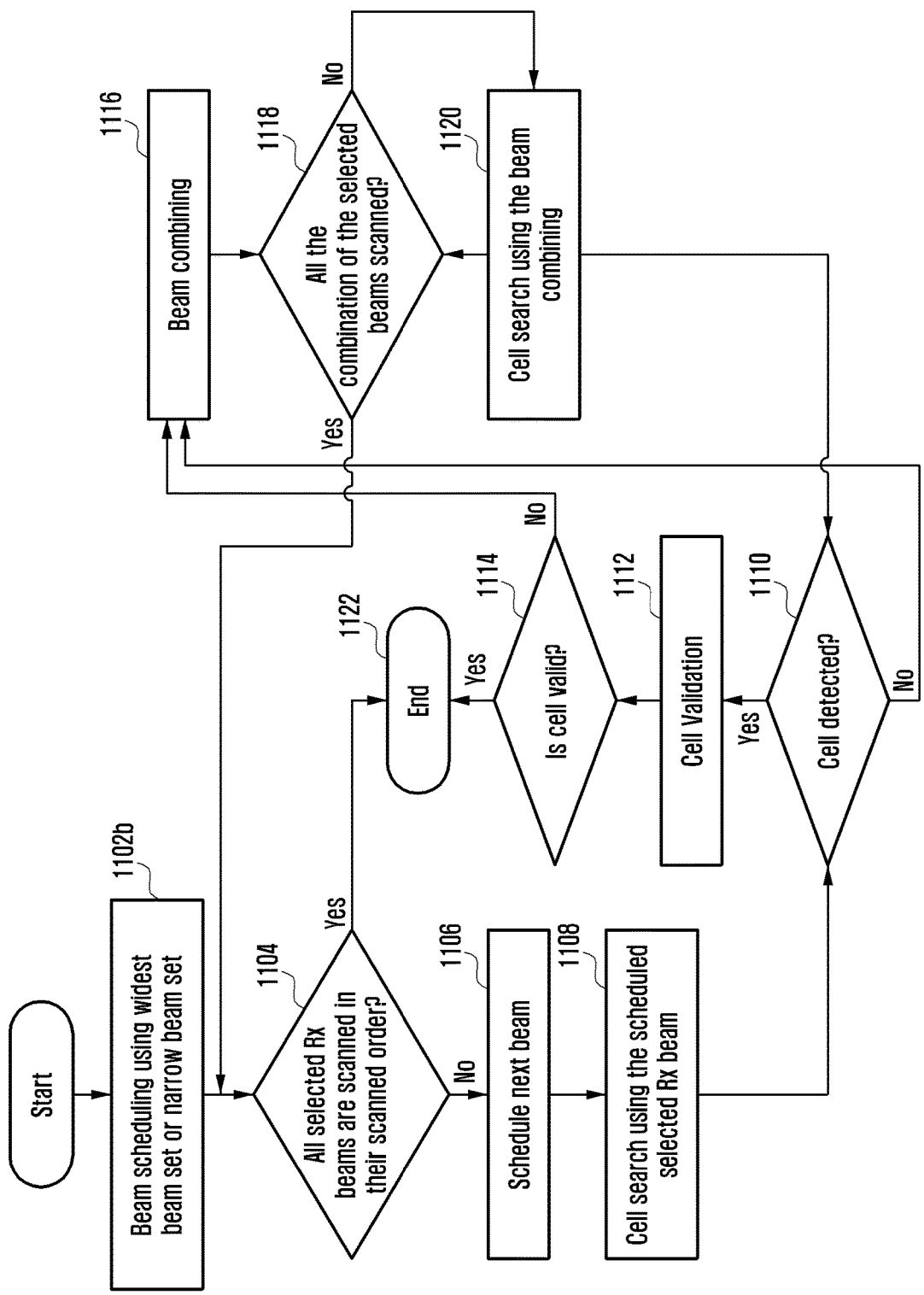

FIGS. 11B and 11B are each example flow diagrams depicting the cell search performed by considering widths of the Rx beams, according to embodiments as disclosed herein.

The UE 204 can perform the cell search by considering the widths of the Rx beams. In an embodiment as depicted in FIG. 11A, at step 1102a, the UE 204 performs the beam scheduling for the cell search by considering the Rx beams of the different widths jointly, after receiving the signals from the BS 202 on the plurality of Rx beams of the different widths. In an embodiment, as depicted in FIG. 11B, at step 1102b, the UE 204 performs the beam scheduling for the cell search by considering the Rx beams of the same width ranging from the widest beam width set to the narrowest beam width set. The beam scheduling involves selecting the Rx beams from the plurality of Rx beams and scheduling the scan order of the Rx beams for the cell search.

As depicted in FIGS. 11A and 11B, at step 1104, the UE 204 checks if all the selected beams have already been scanned in the determined scan order for the cell search. If all the selected Rx beams have already been scanned for the cell search and the cell ID has not been detected, the UE 204 terminates the cell search at step 1122. If all the selected beams have not been scanned, at step 1106, the UE 204 scans the next Rx beam as per the determined scan order, and collects the signal including the OFDM symbols from the scanned selected Rx beam.

At step 1108, the UE 204 performs the cell search using the collected signal from the scanned Rx beam. The UE 204 determines the PSS and the SSS from the collected signal and detects the cell ID of the BS/cell 202 using the PSS and the SSS. At step 1110, the UE 204 checks if the BS/cell or the cell ID has been detected using the signal collected from the scanned Rx beam. If the BS/cell 202 has been detected, at step 1112, the UE 204 validates the detected cell ID or the BS/cell 202 based on the PAPR method. At step 1114, the UE 204 checks if the detected cell ID is valid. If the detected cell ID is valid, at step 1122, the UE terminates the cell search.

If the BS/cell 202 has not been detected using the signal collected from the scanned Rx beam or if the detected cell ID is not valid, at step 1116, the UE 204 checks if the beam combining can be performed and combines the scanned selected Rx beams to form the combined beam set, if the beam combining can be performed. At step 1118, the UE 204 checks if the combined beam set has already been scanned. If the combined beam set has not been scanned, at step 1120, the UE 204 performs the cell search using the combined beam set and performs the steps 1110-1114. The cell search involves detecting the cell ID by identifying the PSS and the SSS in the signals corresponding to the combined beam set. At step 1110, the UE 204 checks if the BS/cell or the cell ID has been detected using the signals corresponding to the combined beam set. If the BS/cell 202 has been detected, at step 1112, the UE 204 validates the detected cell ID or the BS/cell 202 based on the PAPR method. At step 1114, the UE 204 checks if the detected cell ID is valid. If the detected cell ID is valid, at step 1122, the UE terminates the cell search.

If the detected cell ID is not valid (at step 1114), or the combined beam set has already been scanned (at step 1118) or the UE 204 cannot form the combined beam set (at step 1116), the UE 204 repeats the steps 1104-1120 until the cell ID is detected or all the signals corresponding to all the selected Rx beams have been scanned, or all the signals corresponding to all the selected Rx beams have been combined and scanned for the cell search.

Figure 12:
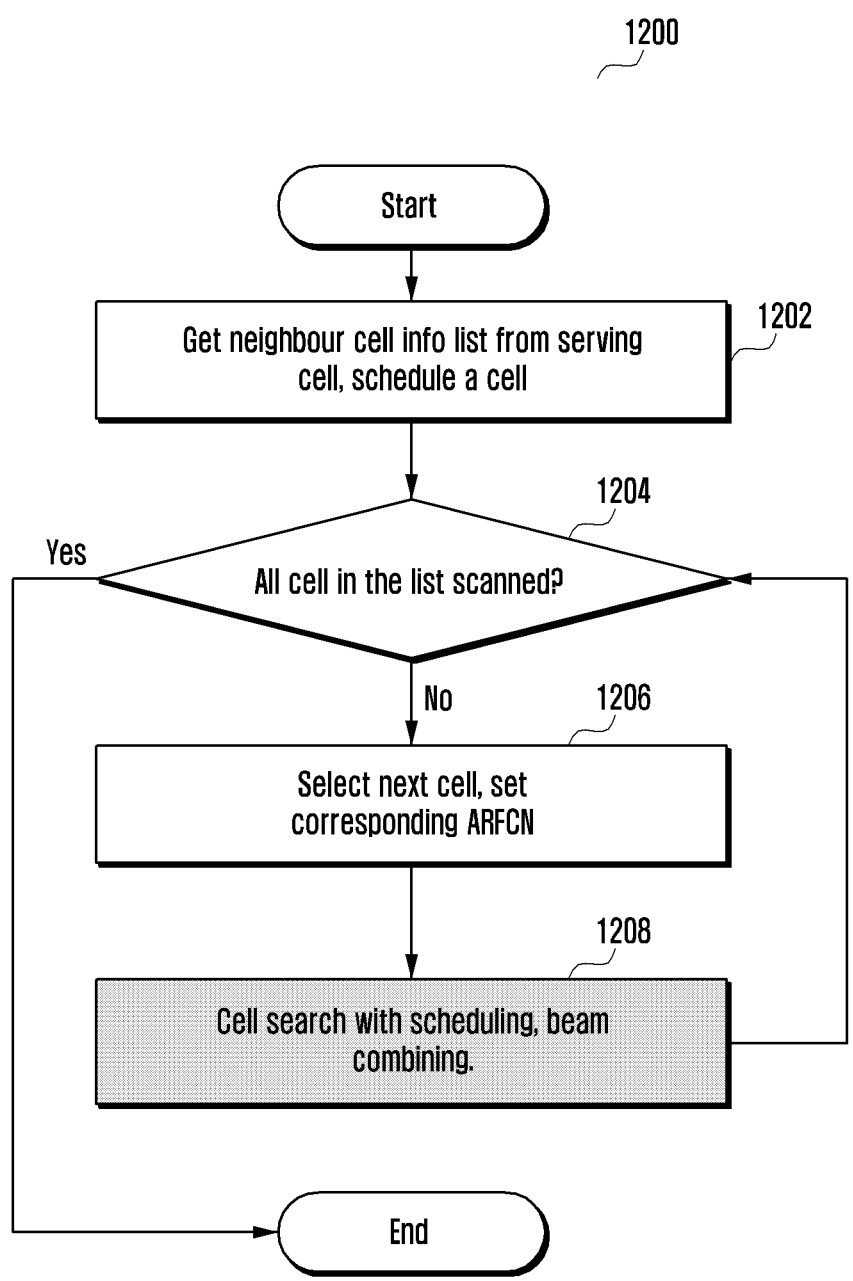
FIG. 12 is an example flow diagram depicting the cell search performed in the connected state of the UE, according to an embodiment as disclosed herein.

FIG. 12 is an example flow diagram 1200 depicting the cell search performed in the connected state, according to an embodiment as disclosed herein.

At step 1202, the UE 204 requests the serving BS 202, and receives the neighbor cell information list, when initiating the cell search in the connected state to detect the neighbor cell for the handover. The UE 204 determines the scan order of the neighbor cells/BS 202 present in the neighbor cell information list for the cell search randomly.

At step 1204, the UE 204 checks if all the neighbor cells/BSs 202 present in the neighbor cell information list have already been scanned. If the neighbor cells/BSs present in the neighbor cell information list have already been scanned, at step 1210, the UE 204 ends the cell search process. If all the neighbor cells/BSs 202 present in the neighbor cell information list have not been scanned, at step 1204, the UE 204 scans the next cell/BS 202 based on the determined scan order and sets the ARFCN for the scanned neighbor cell/BS 202.

At step 1206, the UE 204 performs the cell search to detect the neighbor cell/BS 202 for the handover using the beam scheduling and/or the beam combining with respect to the scanned neighbor cell/BS 202. If the UE 204 detects the neighbor cell/BS 202 that satisfies the S-criterion, at step 1210, the UE 204 ends the cell search process.

If the UE 204 does not detect the neighbor cell/BS 202 or the detected neighbor cell does not satisfy the S-criterion, the UE 204 repeats the steps 1204-1208 until all the neighbor cells/BSs 202 present in the neighbor cell information list have been scanned or the neighbor cell/BS have been detected. Thus, each neighbor cell search can be completed faster with optimized performance due to the beam scheduling and/or beam combining. The various actions in method 1200 may be performed in the order presented, in a different order or simultaneously. Further, in some embodiments, some operations shown in FIG. 12 may be omitted.

Figure 13A:
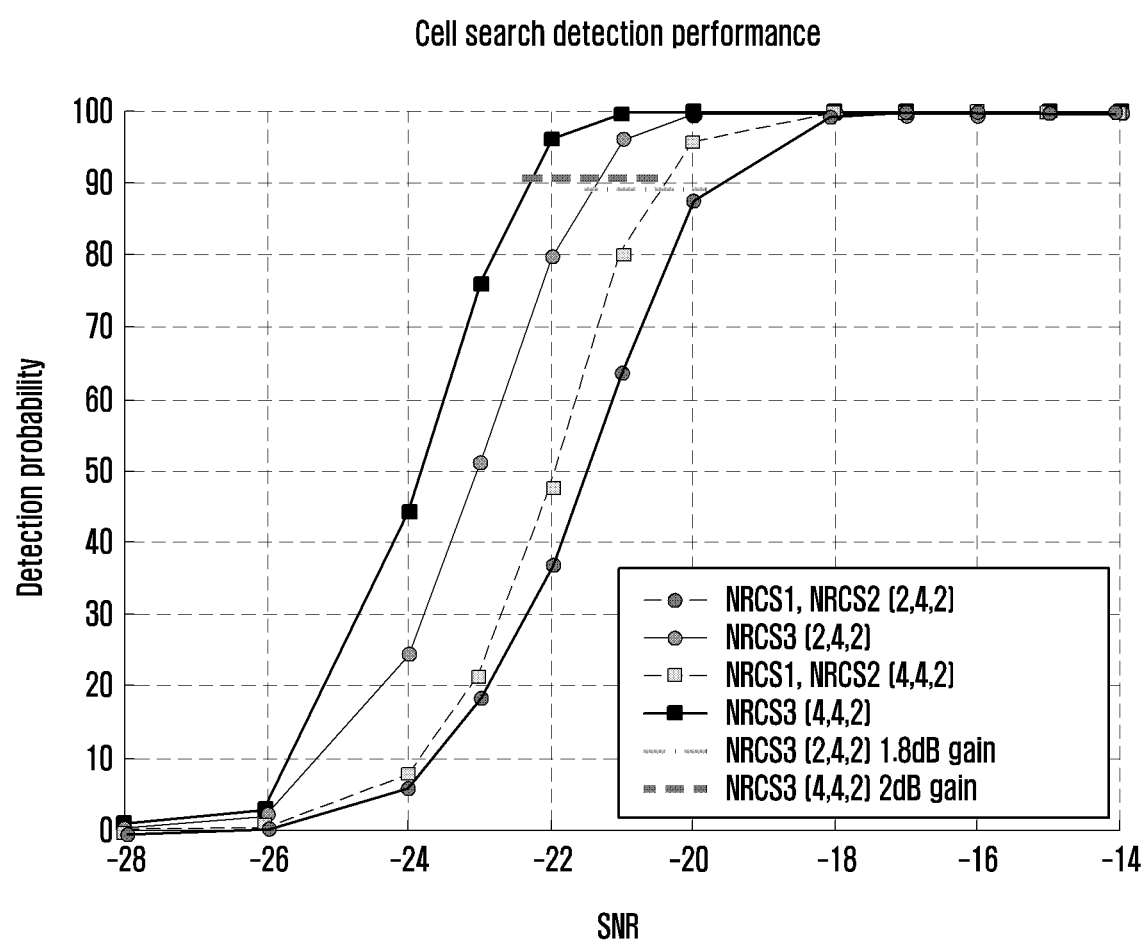
FIG. 13A is an example graph depicting improved cell search performance due to the beam scheduling and/or the beam combining, according to an embodiment as disclosed herein.

FIG. 13A is an example graph depicting improved cell search performance due to the beam scheduling and/or the beam combining, according to an embodiment as disclosed herein.

One or more embodiments disclosed herein enable the UE 204 to perform the cell search using the beam scheduling and/or the beam combining, which results in low cell search latency and high cell search detection performance. In the example depicted in FIG. 13A, NRCS1 represents the conventional approach of performing the cell search without performing the beam scheduling or the beam combining. NRCS2 represents the cell search performed using only the beam scheduling. NRCS3 represents the cell search performed using the beam scheduling and the beam combining (such as tri beam combining in one example, where the combined beam set is formed using 3 selected Rx beams).

From the example graph of FIG. 13A, it is depicted that when the cell search is performed by combining three Rx beams, up to 1.8 dB performance gain can be observed for the antenna configuration/array of size (2, 4, 2) and 2 dB performance for antenna configuration/array of size (4, 4, 2), when compared to the conventional approach.

Figure 13B:
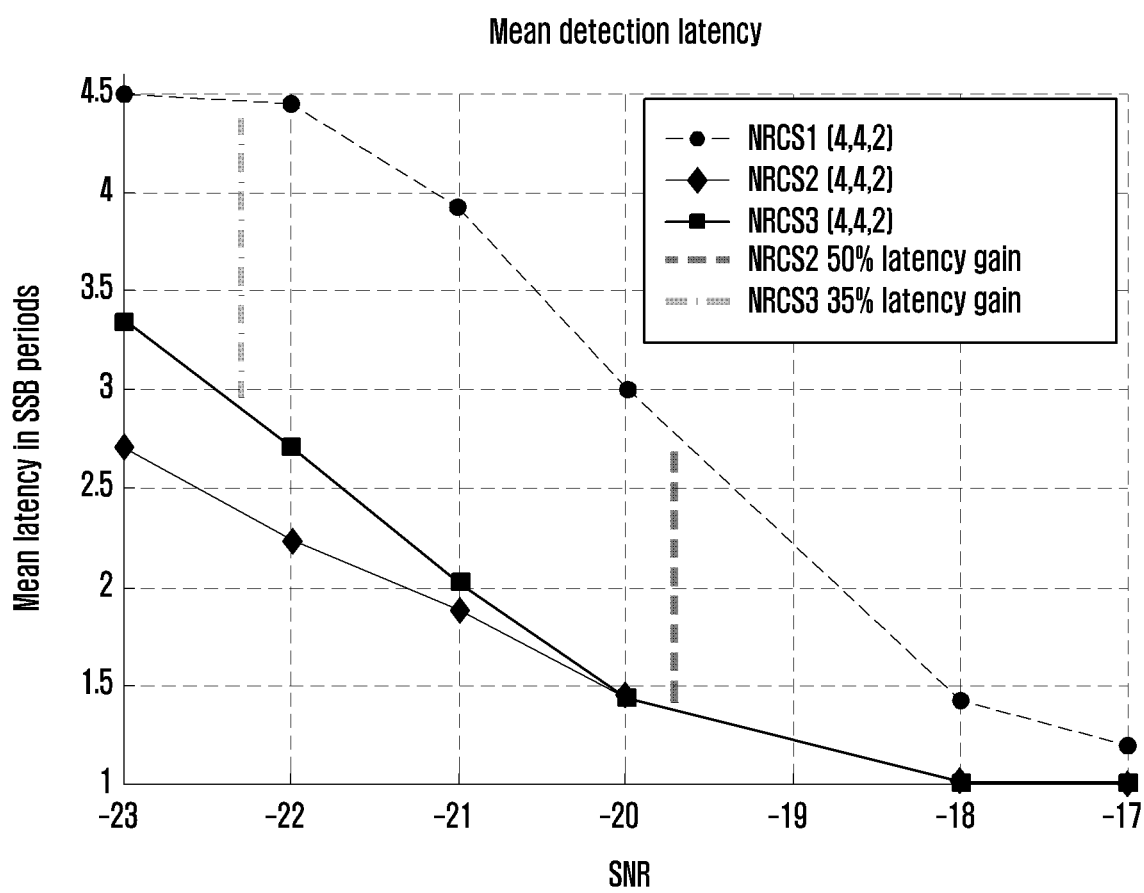
FIG. 13B is an example graph depicting improved cell search latency due to the beam scheduling and/or the beam combining, according to an embodiment as disclosed herein.

FIG. 13B is an example graph depicting improved cell search latency due to the beam scheduling and/or the beam combining, according to an embodiment as disclosed herein.

One or more embodiments disclosed herein enable the UE 204 to perform the cell search using the beam scheduling and/or the beam combining, which results in low cell search latency and high cell search detection performance. In an example, cell search latency resultant from the conventional approach of the cell search that does not use the beam scheduling and the beam combining, cell search latency resultant from the beam scheduling, and cell search latency resultant from the beam scheduling and the beam combining are depicted in FIG. 13b using indicators NRCS1, NRCS2, and NRCS3 respectively.

From the example graph of FIG. 13B, it is depicted that when the cell search is performed by optimal Rx beam scheduling (ORBS), 50% latency gain can be observed, when compared to the conventional approach.

The embodiments disclosed herein can be implemented through at least one software program running on at least one hardware device and performing network management functions to control the elements. The elements shown in FIGS. 2A, 3, and 4, can be at least one of a hardware device, or a combination of hardware device and software module.

The embodiments disclosed herein describe methods and systems for performing a cell search in a millimeter wave (mmWave) based communication network. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A method for performing a cell search in a millimeter wave (mmWave) based communication network, the method comprising:
    monitoring, by a User Equipment (UE), a plurality of signals from at least one Base Station (BS) on a plurality of receive (Rx) beams;
    determining, by the UE, power metrics associated with each of the plurality of Rx beams;
    selecting, by the UE, a subset of Rx beams from the plurality of Rx beams using the determined power metrics associated with each of the plurality of Rx beams; and
    performing, by the UE, the cell search by scanning the selected subset of Rx beams in a pre-determined order to detect a cell identifier (ID) of the at least one BS,
    wherein the selecting, by the UE, of the subset of Rx beams from the plurality of Rx beams is performed in parallel with coarse frequency estimation and correction using a cyclic prefix (CP) with a beam scheduling or a beam combining for one or more of a plurality of absolute radio frequency channel numbers (ARFCNs).

2. The method of claim 1, further comprising:
   detecting that the cell search is unsuccessful using the selected subset of Rx beams individually;
   determining at least two Rx beams of the selected subset of Rx beams based on a combination of the power metrics associated with the at least two Rx beams;
   combining the determined at least two Rx beams of the selected subset of Rx beams to form a combined beam set; and
   performing the cell search using the combined beam set.

3. The method of claim 1, wherein the selecting, by the UE, of the subset of Rx beams further comprises:
   comparing the determined power metrics associated with signals received on each of the plurality of Rx beams with the determined power metrics associated with other signals received on other Rx beams of the plurality of Rx beams;
   determining a subset of signals from the signals that have power metrics of higher values compared to the other signals; and
   selecting the subset of Rx beams that are associated with the subset of signals having the power metrics of the higher values for the cell search.

4. The method of claim 1, wherein the performing, by UE, of the cell search using the selected subset of Rx beams further comprises:
   recursively performing steps of:
      scanning an Rx beam of the selected subset of Rx beams according to the pre-determined order to obtain a signal received on the Rx beam, when all the selected subset of Rx beams are not already scanned;
      performing the cell search using the obtained signal corresponding to the scanned Rx beam individually;
      detecting if the cell search is successful using the scanned Rx beam individually;
      determining if at least two of the selected subset of Rx beams are scanned for the cell search, after detecting that the cell search is not successful using the scanned Rx beam individually;
      combining at least two signals received on the at least two of the selected subset of Rx beams to form a combined beam set, after determining that the at least two of the selected subset of Rx beams are scanned for the cell search;
      performing the cell search using the combined beam set;
      detecting if the cell search is successful using the combined beam set; and
      determining if all the selected subset of Rx beams are already scanned for the cell search, when the cell search is not successful using the combined beam set;
   wherein the steps are recursively performed until the cell search is successful using the selected subset of Rx beams individually or the combined beam set or all the selected subset of Rx beams are scanned.

5. The method of claim 4, wherein the detecting if the cell search is successful further comprises:
   detecting that the cell search is unsuccessful, if at least one of the cell ID, primary synchronization signal (PSS), and/or secondary synchronization signals (SSS) is not detected using one of the selected subset of Rx beams individually and the combined beam set;
   detecting that the cell search is unsuccessful, if a BS corresponding to the cell ID does not satisfy at least one of a peak to average power (PAPR) criterion or a cell selection criterion (S-criterion); or
   detecting that the cell search is successful, if the BS corresponding to the cell ID satisfies the at least one of the PAPR criteria or the S-criterion.

6. The method of claim 2, wherein the combining of the at least two of the selected subset of Rx beams to form the combined beam set further comprises:
   combining power of at least two signals received on the at least two Rx beams of the selected subset of Rx beams to form the combined beam set; or
   combining the power and phase of the at least two signals received on the at least two Rx beams of the selected subset of Rx beams to form the combined beam set.

7. The method of claim 1, further comprising performing, by the UE, the cell search with respect to an Absolute radio-frequency channel number (ARFCN) list assigned for at least one Subscriber Identity Module (SIM) of the UE, wherein the ARFCN list includes the plurality of ARFCNs and associated location data.

8. The method of claim 7, wherein the performing, by the UE, of the cell search based on the ARFCN list further comprises:
   determining a scan order for the plurality of ARFCNs present in the ARFCN list; and
   performing an ARFCN cell search action recursively until the cell search is successful with respect to one of the plurality of ARFCNs or completion of scanning of all the plurality of ARFCNs, wherein the ARFCN cell search action includes:
      scanning the plurality of Rx beams for each ARFCN in the plurality of ARFCNs according to the determined scan order;
      determining the power metrics associated with each Rx beam of the scanned plurality of Rx beams;
      selecting the subset of Rx beams from the plurality of Rx beams for each ARFCN using the determined power metrics associated with each Rx beam; and
      performing the cell search using the selected subset of Rx beams for each ARFCN to detect the cell ID of the at least one BS.

9. The method of claim 1, wherein a power metric for a $k^{th}$ beam in plurality of Rx beams is measured by the equation:

$$P^K = \frac{1}{|\mathcal{P}| \cdot \Lambda} \cdot \sum_{p \in \mathcal{P}} \sum_{n=0}^{\Lambda-1} |y_p^k(n)|^2$$

wherein $P^K$ represents the power metric of a signal received on the $k^{th}$ beam, $\Lambda$ represents a number of time domain samples of a signal received on a Rx beam for measuring the power metric, $\mathcal{P}$ represents polarization of the $\Lambda$ samples, and $y_p^k(n)$ represents the signal received on the $k^{th}$ beam.

10. A User Equipment (UE) in a millimeter wave (mm-Wave) based communication network comprising:
   a memory; and
   a controller coupled to the memory configured to:
      monitor a plurality of signals from at least one Base Station (BS) on a plurality of receive (Rx) beams;
      determine power metrics associated with each of the plurality of Rx beams;

select a subset of Rx beams from the plurality of Rx beams using the determined power metrics associated with each of the plurality of Rx beams; and perform a cell search by scanning the selected subset of Rx beams in a pre-determined order to detect a cell identifier (ID) of the at least one BS, wherein the controller is further configured to select the subset of Rx beams from the plurality of Rx beams in parallel with coarse frequency estimation and correction using a cyclic prefix (CP) correlation with a beam scheduling or a beam combining for one or more of a plurality of absolute radio frequency channel numbers (ARFCNs).

11. The UE of claim 10, wherein the controller is further configured to:

detect that the cell search is unsuccessful using the selected subset of Rx beams individually;

determine at least two Rx beams of the selected subset of Rx beams based on a combination of the power metrics associated with the at least two Rx beams;

combine the determined at least two Rx beams of the selected subset of Rx beams to form a combined beam set; and perform the cell search using the combined beam set.

12. The UE of claim 10, wherein the controller is further configured to:

compare the determined power metrics associated with signals received on each of the plurality of Rx beams with the determined power metrics associated with other signals received on other Rx beams of the plurality of Rx beams;

determine a subset of signals from the signals that have power metrics of higher values compared to the other signals; and select the subset of Rx beams that are associated with the subset of signals having the power metrics of the higher values for the cell search.

13. The UE of claim 10, wherein the controller is further configured to recursively perform steps of:

scan an Rx beam of the selected subset of Rx beams according to the pre-determined order to obtain a signal received on the Rx beam, when all the selected subset of Rx beams are not already scanned;

perform the cell search using the obtained signal corresponding to the scanned Rx beam individually;

detect if the cell search is successful using the scanned Rx beam individually;

determine if at least two of the selected subset of Rx beams are scanned for the cell search, after detecting that the cell search is not successful using the scanned Rx beam individually;

combine at least two signals received on the at least two of the selected subset of Rx beams to form a combined beam set, after determining that the at least two of the selected subset of Rx beams are scanned for the cell search;

perform the cell search using the combined beam set;

detect if the cell search is successful using the combined beam set; and determine if all the selected subset of Rx beams are already scanned for the cell search, when the cell search is not successful using the combined beam set;

wherein the steps are recursively performed until the cell search is successful using the selected Rx beams individually or the combined beam set or all the selected subset of Rx beams are scanned.

14. The UE of claim 13, wherein the controller is further configured to:

detect that the cell search is unsuccessful, if at least one of the cell ID, primary synchronization signal (PSS), and/or secondary synchronization signals (SSS) is not detected using one of the selected subset of Rx beams individually and the combined beam set;

detect that the cell search is unsuccessful, if a BS corresponding to the cell ID does not satisfy at least one of a peak to average power (PAPR) criterion or a cell selection criterion (S-criterion); or detect that the cell search is successful, if the BS corresponding to the cell ID satisfies the at least one of the PAPR criteria or the S-criterion.

15. The UE of claim 11, wherein the controller is further configured to:

combine power of at least two signals received on the at least two Rx beams of the selected subset of Rx beams to form the combined beam set; or combine the power and phase of the at least two signals received on the at least two Rx beams of the selected subset of Rx beams to form the combined beam set.

16. The UE of claim 10, wherein the controller is further configured to: perform the cell search with respect to an Absolute radio-frequency channel number (ARFCN) list assigned for at least one Subscriber Identity Module (SIM) of the UE, wherein the ARFCN list includes the plurality of ARFCNs and associated location data.

17. The UE of claim 16, wherein the controller is further configured to:

determine a scan order for the plurality of ARFCNs present in the ARFCN list; and perform an ARFCN cell search action recursively until the cell search is successful with respect to one of the plurality of ARFCNs or completion of scanning of all the plurality of ARFCNs, wherein the ARFCN cell search action includes:

scanning the plurality of Rx beams for each ARFCN in the plurality of ARFCNs according to the determined scan order;

determining the power metrics associated with each Rx beam of the scanned plurality of Rx beams;

selecting the subset of Rx beams from the plurality of Rx beams for each ARFCN using the determined power metrics associated with each Rx beam; and performing the cell search using the selected subset of Rx beams for each ARFCN to detect the cell ID of the at least one BS.

18. The UE of claim 10, wherein a power metric for a $k^{th}$ beam in the plurality of Rx beams is measured by the equation:

$$P^K = \frac{1}{|P| \cdot \Lambda} \cdot \sum_{p \in P} \sum_{n=0}^{\Lambda-1} |y_p^k(n)|^2$$

wherein $P^K$ represents the power metric of a signal received on the $k^{th}$ beam, $\Lambda$ represents a number of time domain samples of a signal received on a Rx beam for measuring the power metric, $\mathcal{P}$ represents polarization of the $\Lambda$ samples, and $y_p^k(n)$ represents the signal received on the $k^{th}$ beam.

\* \* \* \* \*